(12) United States Patent
Ikeda

(10) Patent No.: US 6,332,666 B1
(45) Date of Patent: Dec. 25, 2001

(54) PRINTING APPARATUS, RESOLUTION CONVERSION PRINTING METHOD FOR PRINTING APPARATUS, AND STORAGE MEDIUM STORING COMPUTER-READABLE PROGRAM

(75) Inventor: Sanae Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/580,955

(22) Filed: May 30, 2000

(30) Foreign Application Priority Data

May 28, 1999 (JP) ................................. 11-149488
May 24, 2000 (JP) ............................. 2000-152930

(51) Int. Cl.$^7$ ...................................................... B41J 2/15
(52) U.S. Cl. ............................. 347/40; 358/1.7; 358/1.9; 347/225
(58) Field of Search ................................. 347/40, 5, 12, 347/225, 238, 237, 112, 116; 358/1.5, 1.7, 1.9, 1.16, 1.18, 1.2, 1.13

(56) References Cited

U.S. PATENT DOCUMENTS 4,655,622 * 4/1987 Aoki ..................................... 400/121
5,586,225 * 12/1996 Onizuka et al. ...................... 358/1.2
6,064,489 * 5/2000 Nosaki et al. ...................... 358/1.13

* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

In a laser beam printer, it is thought that the number of scanning lines for the unit length in a sheet carrying direction (a resolution of a sub scanning direction) can be changed by making processing speed in the sheet carrying direction changeable. Further, in a general printer, raster data is generated based on vector data or code data from a superior apparatus (expansion). Ordinarily, in the printer, the raster data corresponding to resolution of a printing unit is generated by the expansion, and the generated raster data is output to the printing unit. In a printing apparatus which has the above printing unit capable of changing at least a resolution of a predetermined direction, even when the printing unit prints the data from the superior apparatus with a resolution 1/N times (N is an integer of two or more) a predetermined resolution for the predetermined direction, the printing data is expanded into the raster data with the predetermined resolution, and the resolution of the predetermined direction of the raster data is converted by generating the pixel value of one pixel, on the basis of pixel values of N pixels aligned with the predetermined direction of the obtained raster data.

20 Claims, 16 Drawing Sheets

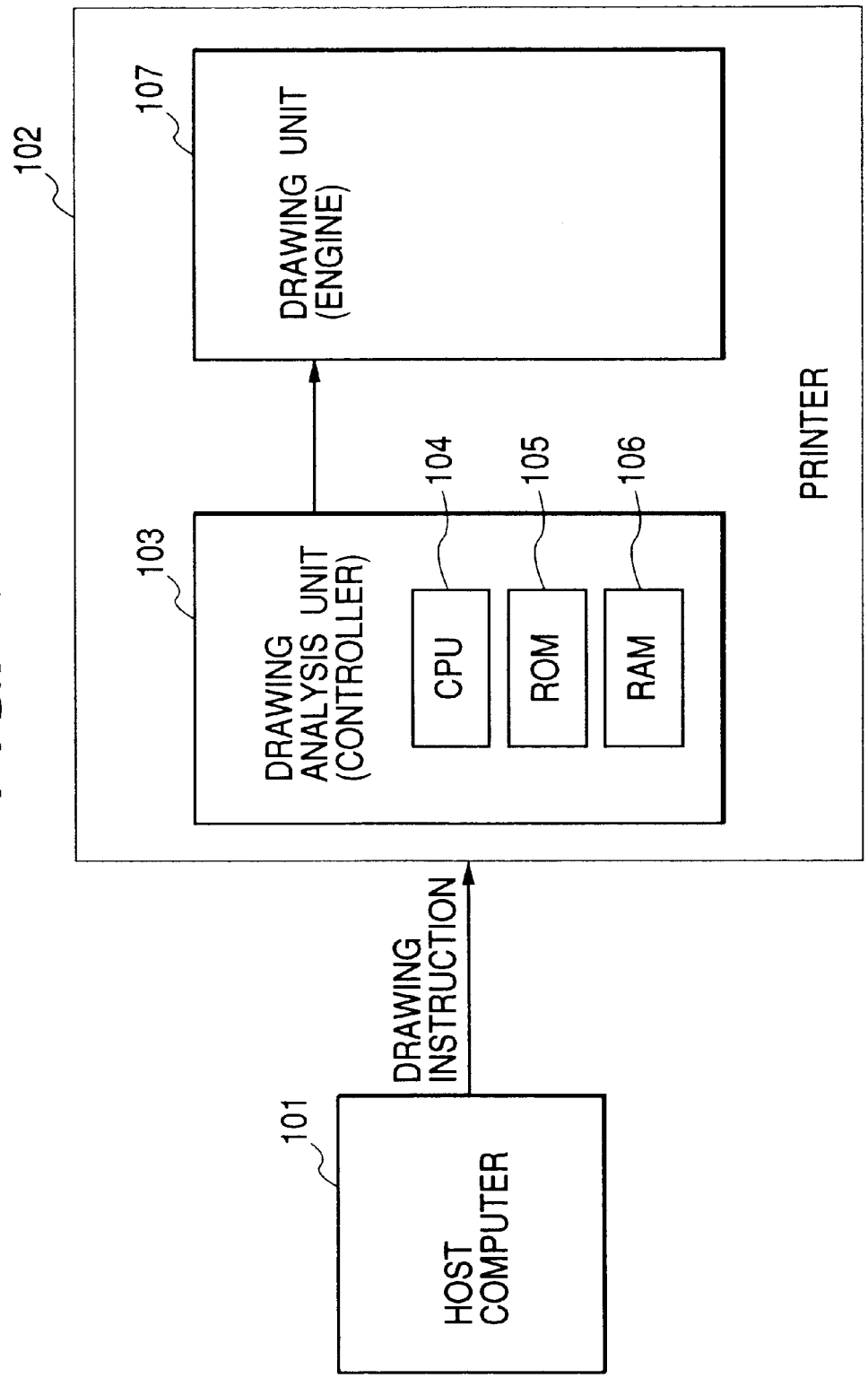

FIG. 2A
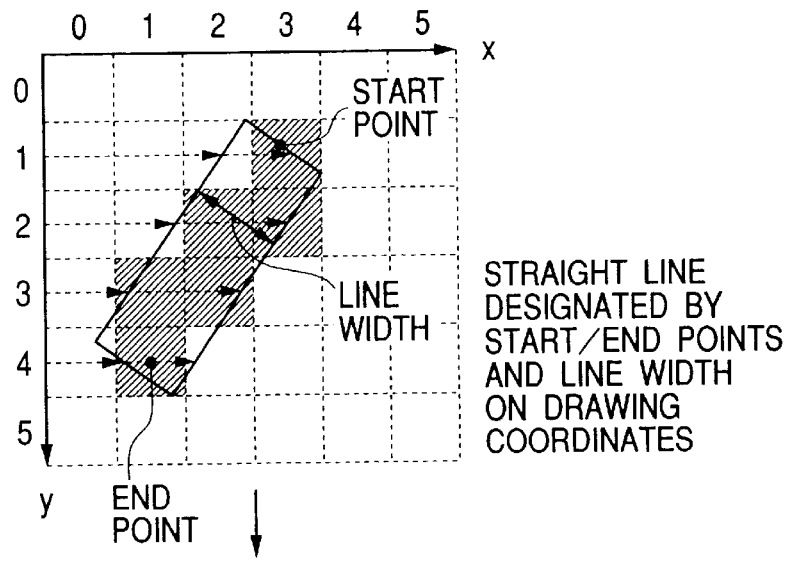
STRAIGHT LINE DESIGNATED BY START/END POINTS AND LINE WIDTH ON DRAWING COORDINATES
FIG. 2B
| y | xL | xR |
|---|----|----|
| 0 | -  | -  |
| 1 | 3  | 3  |
| 2 | 2  | 3  |
| 3 | 1  | 2  |
| 4 | 1  | 1  |
| 5 | -  | -  |
| ... | - | - |
DATA OBTAINED BY REPRESENTING ABOVE STRAIGHT LINE IN RUN LENGTH FORM
FIG. 2C
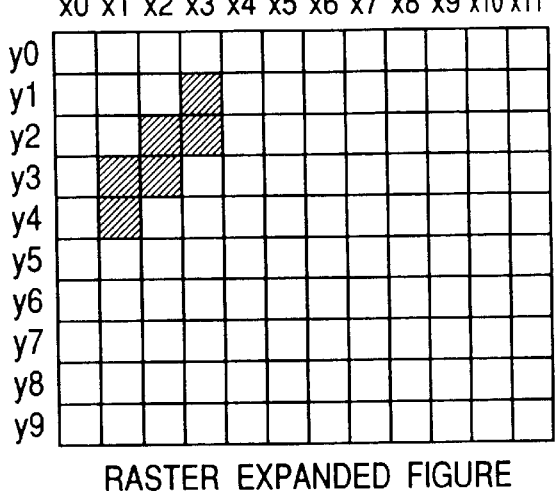
RASTER EXPANDED FIGURE

PIXEL INTEGRATION RULE

PIXEL INTEGRATION RULE

PIXEL INTEGRATION RULE

PIXEL INTEGRATION RULE

PRINTING APPARATUS, RESOLUTION CONVERSION PRINTING METHOD FOR PRINTING APPARATUS, AND STORAGE MEDIUM STORING COMPUTER-READABLE PROGRAM

BACKGROUND OF THE INVENTION

1. Field of the Invention

The present invention relates to a printing apparatus, a resolution conversion printing method for the printing apparatus, an image processing method for the printing apparatus, and a storage medium storing a computer-readable program.

2. Related Background Art

Conventionally, in a printing apparatus such as a dot-matrix page printer, e.g., a laser beam printer, an inkjet printer or the like, vector data representing a figure, a character and the like is converted into raster data composed of sets of pixels (dots), and the obtained raster data is expanded or extracted in an internal memory space corresponding to one page. Based on the expanded data, toner or ink is adhered to a specific position (within a range corresponding to each pixel area) on a printing medium, thereby performing printing.

Hereinafter, such a printing mechanism of the laser beam printer will be explained by way of example.

Printing data transferred from a host computer is expanded by a printer controller into raster data composed of sets of pixel data. At this time, the number of pixels which compose the raster data and are assumed to be existent in unit area is called "data resolution".

Then a video signal is generated based on the raster data, and the obtained video signal is converted into a laser driving signal for controlling on and off of a laser beam. The laser beam generated based on this laser driving signal (i.e., the video signal) is irradiated onto a photosensitive drum previously electrified by negative charge.

When the laser beam scans the electrified photosensitive drum, the charge on the portion to which the beam was irradiated disappears, whereby a potential difference occurs between the portion to which the beam was irradiated and the portion to which the beam is not irradiated. Thus a latent image of which shape is identical with that represented by the raster data is formed on the photosensitive body. When toner of positive charge is adhered to the photosensitive drum on which the latent image has been formed, a visible image is formed.

In the printing apparatus having an above-described feature, there are two kinds of laser beam scanning directions, i.e., one is a horizontal direction which is parallel with a sheet carrying direction, and the other is a vertical direction which is perpendicular to the sheet carrying direction. First, along a line on the photosensitive drum, the laser beam scanning is performed in the direction parallel with a drum axial direction (main scanning). When the scanning of this line ends, the scanning is performed along a next line. On the other hand, since the photosensitive drum is rotatively driven, a start position of the main scanning is off to a direction perpendicular to the drum axial direction (sub scanning). Thus the latent image is formed in a two-dimensional area on the sheet.

At this time, the number of pixels capable of being represented in the unit area on the drum is called "engine resolution". When the main scanning speed is constant and the laser beam is on and off for each pixel, the engine resolution in the main scanning direction is determined according to an interval of on and off, the engine resolution in the sub scanning direction is determined according to rotation speed of the photosensitive drum.

Incidentally, the raster data generally has information of one bit or plural bits for each pixel.

Ordinarily, in a monochrome printing apparatus, one pixel often has information (binary information) of one bit (0 (representing "off") and 1 (representing "on")). In this case, a laser beam which is to be modulated based on such raster data is modulated only to be "on" or "off" for each pixel. Therefore, when printing data received from the host computer is multivalue data, the monochrome printing apparatus has to convert this multivalue data into binary raster data according to pulse-surface-area modulation (i.e., an area gradation method) or the like. In such the printing apparatus, printing quality tends to improve by increase of the resolution of the image to be printed.

Further, like many kinds of color printing apparatuses, when the raster data represents halftone for each pixel by plural-bit information, there are several methods of representing halftone density. For example, there is a method of changing an on time of the laser beam for each pixel according to density, a method of changing a charge level according to density, or the like. In any method, when the number of gradations of the printing data received from the host computer is different from the number of gradations representable by the printing apparatus, like the binary data, it is necessary to convert the number of gradations of the printing data received from the host computer into the number of gradations representable by the printing apparatus. In such the printing apparatus, printing quality improves by increase of the number of representable gradations as well as the resolution of the image to be printed.

In ordinary printing, optimum printing quality can be kept when the data is output with the engine resolution same as the data resolution.

As described above, when the laser beam is on and off for each pixel, it is necessary to increase both the data resolution and the engine resolution in order to improve the image quality.

Further, in the ordinary data, since the resolution in the main scanning direction is identical with that in the sub scanning direction, it is necessary to increase the data resolution and the engine resolution respectively in both the main and sub scanning directions.

At this time, since the engine resolution in the main scanning direction can be electrically changed by controlling an on/off interval of the laser beam, when the engine resolution in the main scanning direction is increased, an influence on engine speed is comparatively low. However, when the engine resolution in the sub scanning direction is increased, since a drum rotation angle is decreased, the engine speed (i.e., printing speed) is resultingly slowed down. Thus, there is a problem that the slowdown of the engine speed greatly influences a printing time.

Further, for example, when the engine speed (i.e., the printing speed) is set to be double speed, since the resolution in the main scanning direction is identical with that in the sub scanning direction as described above, it is necessary to print the data as setting not only the engine resolution in the sub scanning direction but also the engine resolution in the main scanning direction to be low. Thus, there is a problem of extremely lowering the printing quality.

SUMMARY OF THE INVENTION

An object of the present invention is to solve the above-described problems.

Another object of the present invention is to provide a printing apparatus which has a printing unit capable of performing printing in a main scanning direction and in a sub scanning direction perpendicular to the main scanning direction respectively with different resolutions and can perform printing in image quality higher than that in a case where both the main and sub scanning directions are set to be low resolution at printing speed higher than that in a case where both the main and sub scanning directions are set to be high resolution, a resolution conversion printing method for the printing apparatus, an image processing method for the printing apparatus, and a storage medium storing a computer-readable program.

Still another object of the present invention is to provide a printing apparatus which has a printing unit capable of changing printing speed in a sub scanning direction and can perform printing in image quality higher than that in a case where both main and sub scanning directions are set to be low resolution at printing speed higher than that in a case where both the main and sub scanning directions are set to be high resolution, a resolution conversion printing method for the printing apparatus, an image processing method for the printing apparatus, and a storage medium storing a computer-readable program.

According to the present invention, there is provided a printing apparatus (a printer 102 shown in FIG. 1) which has a printing unit (a drawing unit (engine) 107 shown in FIG. 1) capable of performing printing in a main scanning direction and in a sub scanning direction perpendicular to the main scanning direction respectively with different resolutions, comprising:

a storage means (a RAM 106 shown in FIG. 1) for storing raster data expanded into binary data of first and second pixel values (ON "1" and OFF "0") with a predetermined resolution;

a first setting means for setting a multiple-speed number of printing speed to the printing unit, the multiple-speed number representing what times standard printing speed the printing is to be performed at (in response to an instruction from a host computer 101 shown in FIG. 1, a CPU 104 performs setting to the drawing unit (engine) 107 on the basis of a program stored in a ROM 105 or a not-shown storage medium);

a second setting means for setting the printing resolution of the main scanning direction to be the resolution of the raster data stored in the storage means, and setting the printing resolution of the sub scanning direction to be a quotient of the resolution of the raster data divided by the multiple-speed number of the printing speed, to the printing unit (the CPU 104 shown in FIG. 1 performs setting to the drawing unit (engine) 107 on the basis of a program stored in the ROM 105 or a not-shown storage medium); and a resolution conversion output means for outputting a video signal to the printing unit, the video signal being obtained by integrating or unifying to one pixel an area aligned with the sub scanning direction of the raster data stored in the storage means and composed of pixels of the number as much as the multiple-speed number of the printing speed (the CPU 104 shown in FIG. 1 integrates the pixels as shown in FIGS. 3A and 3B or FIGS. 7A and 7B and outputs the integrated pixels to the drawing unit (engine) 107 on the basis of a program stored in the ROM 105 or a not-shown storage medium).

Preferably, the resolution conversion output means determines a value of the one pixel obtained by integrating the area, on the basis of the number of pixels of the first pixel value or the number of pixels of the second pixel value existing within the area. On the other hand, when the number of pixels of the first pixel value is the same as the number of pixels of the second pixel value existing within the area, the resolution conversion output means determines the value of the one pixel obtained by integrating the area, on the basis of distribution position of the pixels having the first pixel value or distribution position of the pixels having the second pixel value existing within the area.

According to the present invention, there is provided a resolution conversion printing method for a printing apparatus having a printing unit capable of performing printing in a main scanning direction and in a sub scanning direction perpendicular to the main scanning direction respectively with different resolutions, the method comprising:

an expansion step (a step S3 of FIG. 4) of expanding printing information into raster data of a predetermined resolution, on a memory;

a first setting step (a step S4 of FIG. 4) of setting a multiple-speed number of printing speed to the printing unit, the multiple-speed number representing what times standard printing speed the printing is to be performed at;

a second setting step (steps S5 to S9 of FIG. 4, and steps S10 to S17 of FIG. 5) of setting the printing resolution of the main scanning direction to be the resolution of the raster data expanded on the memory, and setting the printing resolution of the sub scanning direction to be a quotient of the resolution of the raster data divided by the multiple-speed number of the printing speed, to the printing unit; and an output step (steps S20 to S32 of FIG. 6, steps S51 to S64 of FIG. 8, and steps S65 to S69 of FIG. 9) of outputting a video signal to the printing unit, the video signal being obtained by integrating to one pixel an area aligned with the sub scanning direction of the raster data expanded on the memory and composed of pixels of the number as much as the multiple-speed number of the printing speed.

According to the present invention, there is provided a storage medium which stores a computer-readable program to control a printing apparatus having a printing unit capable of performing printing in a main scanning direction and in a sub scanning direction perpendicular to the main scanning direction respectively with different resolutions, the program comprising:

an expansion step (a step S3 of FIG. 4) of expanding printing information into raster data of a predetermined resolution, on a memory;

a first setting step (a step S4 of FIG. 4) of setting a multiple-speed number of printing speed to the printing unit, the multiple-speed number representing what times standard printing speed the printing is to be performed at;

a second setting step (steps S5 to S9 of FIG. 4, and steps S10 to S17 of FIG. 5) of setting the printing resolution of the main scanning direction to be the resolution of the raster data expanded on the memory, and setting the printing resolution of the sub scanning direction to be a quotient of the resolution of the raster data divided by the multiple-speed number of the printing speed, to the printing unit; and an output step (steps S20 to S32 of FIG. 6, steps S51 to S64 of FIG. 8, and steps S65 to S69 of FIG. 9) of outputting a video signal to the printing unit, the video signal being obtained by integrating to one pixel an area aligned with the sub scanning direction of the raster data expanded on the memory and composed of pixels of the number as much as the multiple-speed number of the printing speed.

According to the present invention; there is provided another printing apparatus which has a printing unit (a drawing unit (engine) 107) capable of performing printing with resolutions of main and sub scanning directions different from each other by changing printing speed, comprising:

an expansion means (a CPU 104 shown in FIG. 1) for expanding printing data from a superior apparatus into raster data with a predetermined resolution;

a storage means (a RAM 106 shown in FIG. 1) for storing the expanded raster data;

a raster data conversion means (the CPU 104 shown in FIG. 1) for generating, when the printing unit performs the printing at speed N times (N is an integer of two or more) printing speed corresponding to the predetermined resolution, the raster data obtained by integrating to one pixel an area composed of N pixels, on the basis of the raster data of N pixels aligned with the sub scanning direction of the raster data stored in the storage means; and an output means for outputting the raster data converted by the raster data conversion means to the printing unit.

According to the present invention, there is provided still another printing apparatus (a printer 102 shown in FIG. 1) which has a printing unit (a drawing unit (engine) 107) capable of performing printing with resolutions of main and sub scanning directions differentiated by changing printing speed, comprising:

an expansion means (a CPU 104 shown in FIG. 1) for expanding printing data from a superior apparatus into raster data with a predetermined resolution;

a storage means (a RAM 106 shown in FIG. 1) for storing the expanded raster data;

a raster data conversion means (the CPU 104 shown in FIG. 1) for generating, when the printing unit performs the printing at speed N times (N is an integer of two or more) printing speed corresponding to the predetermined resolution, the raster data obtained by integrating to one pixel an area composed of N pixels, on the basis of the raster data of N pixels aligned with the sub scanning direction of the raster data stored in the storage means; and an output means (an step S28 of FIG. 6 or the like) for outputting the raster data converted by the raster data conversion means to the printing unit.

Preferably, the raster data conversion means determines a pixel value of the raster data obtained by integrating the N-pixel area to the one pixel, on the basis of the number of pixels of a predetermined pixel value among the N pixels, on the basis of the number of pixels of the predetermined pixel value among the N pixels and distribution position of the pixels of the predetermined pixel value within the area, on the basis of the sum of the pixel values of the N pixels, or on the basis of the number of pixels of the predetermined pixel value among the N pixels and a pixel value of the pixel corresponding to an area adjacent to the N-pixel area.

According to the present invention, there is provided still another printing apparatus (a printer 102 shown in FIG. 1) which has a printing unit (a drawing unit (engine) 107 shown in FIG. 1) capable of changing at least a resolution of a predetermined direction, comprising:

an expansion means (a CPU 104 shown in FIG. 1) for expanding, even when the printing unit performs the printing for the predetermined direction with a resolution 1/N times (N is an integer of two or more) a predetermined resolution, printing data from a superior apparatus into raster data with the predetermined resolution;

a storage means (a RAM 106 shown in FIG. 1) for storing the expanded raster data;

a raster data conversion means (the CPU 104 shown in FIG. 1) for converting, when the printing unit performs the printing for the predetermined direction with the resolution 1/N times the predetermined resolution, the resolution of the raster data for the predetermined direction by generating a pixel value of one pixel, on the basis of pixel values of N pixels aligned with the predetermined direction of the raster data stored in the storage means; and an output means (a step S28 of FIG. 6 or the like) for outputting the raster data converted by the raster data conversion means to the printing unit.

According to the present invention, there is provided another image processing method for a printing apparatus (a printer 102 shown in FIG. 1) having a printing unit (a drawing unit (engine) 107 shown in FIG. 1) capable of changing at least a resolution of a predetermined direction, the method comprising:

an expansion step (a step S3 of FIG. 4 or the like) of expanding, even when the printing unit performs printing with a resolution 1/N times (N is an integer of two or more) a predetermined resolution, printing data from a superior apparatus into raster data with the predetermined resolution;

a storage step (a step S3 of FIG. 4 or the like) of storing the expanded raster data in a storage means;

a raster data conversion step (steps S20 to S27 of FIG. 6 or the like) of converting, when the printing unit performs the printing for a predetermined direction with the resolution 1/N times the predetermined resolution, the resolution of the raster data for the predetermined direction by generating a pixel value of one pixel, on the basis of pixel values of N pixels aligned with the predetermined direction of the raster data stored in the storage means; and an output step (a step S28 of FIG. 6 or the like) of outputting the raster data converted in said raster data conversion step to the printing unit.

Preferably, the pixel value of the one pixel to be generated is determined, on the basis of the number of pixels of a predetermined pixel value among the N pixels, on the basis of the number of pixels of the predetermined pixel value among the N pixels and positions of the pixels of the predetermined pixel value, on the basis of the sum of the pixel values of the N pixels, or on the basis of the number of pixels of the predetermined pixel value among the N pixels and a pixel value of the pixel adjacent to the N pixels.

According to the present invention, in the printing apparatus which has the printing unit capable of performing the printing in the main scanning direction and in the sub scanning direction perpendicular to the main scanning direction respectively with different resolutions, it is possible to output an image of which quality is higher than that in the case where both the main and sub scanning directions are set to be low resolution, at the printing speed same as that in the case where both the main and sub scanning directions are set to be low resolution.

Further, according to the present invention, when the number of pixels of the first pixel value is the same as the number of pixels of the second pixel value existing within the area, the resolution conversion output means determines the value of the one pixel obtained by integrating the area, on the basis of the distribution position of the pixels having the first pixel value or the distribution position of the pixels having the second pixel value existing within the area. Thus, it is possible to output a high-quality image without unevenness of density.

Further, according to the present invention, in the printing apparatus which can represent intermediate density, on the basis of the sum of the densities of the pixels (of the expanded raster data) existing within a 1×N area, the density of the pixel is determined. Thus, it is possible to lower the resolution of the sub scanning direction with the density of the original data within the unit area maintained.

Further, according to the present invention, when on/off or the density of the pixel is determined, the state of the pixel is observed to determine the state of the pixel with the after-conversion resolution. Thus, it is possible to prevent generation of isolated pixels which become a deterioration factor of pixel reproducibility in electrophotographic processing. Besides, it is possible to obtain a printed result in which density distribution of an original (or former) image is reproduced more faithfully.

Other objects and features of the present invention will become apparent from the following detailed description and the attached drawings.

BRIEF DESCRIPTION OF THE DRAWINGS

FIG. 1 is a block diagram showing a structure of a printing apparatus according to the first embodiment of the present invention;

FIGS. 2A, 2B and 2C are diagrams showing data transition in a case where a controller shown in FIG. 1 expands printing data into raster data;

DETAILED DESCRIPTION OF PREFERRED EMBODIMENTS

First Embodiment

Figure 3A:
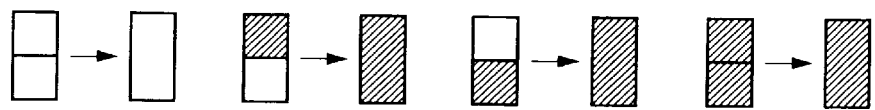
FIGS. 3A and 3B are diagrams showing a first pixel conversion (integration) concept of the printing apparatus according to the present invention.

FIG. 1 is a block diagram for explaining a structure of a printing apparatus according to the first embodiment of the present invention.

In FIG. 1, numeral 102 denotes a printing apparatus (a printer) which is composed of a drawing analysis unit (a controller) 103 and a drawing unit (an engine) 107.

A drawing instruction (printing data) sent from a host computer 101 is expanded by the controller 103 into raster data being an aggregation of pixel data with a resolution designated by the host computer 101. This is later disclosed in FIGS. 2A, 2B and 2C. Also, a laser driving signal (a video signal) for controlling on/of f of a laser beam is generated based on this raster data, and this laser driving signal is output to the engine 107.

Numeral 104 denotes a CPU which expands the printing data sent from the host computer 101 into the binary raster data with the resolution designated by the host computer 101, on the basis of a program stored in a ROM 105 or a not-shown storage medium. Further, the CPU 104 generates the video signal from the raster data, outputs the generated video signal to the engine 107, and comprehensively controls the entire printer 102.

Numeral 106 denotes the RAM which is used as a working area of the CPU 104, an expansion area to which the raster data is expanded by the CPU 104, and the like.

The engine 107 irradiates the laser beam to a photosensitive drum previously electrified by negative charge, on the basis of the laser driving signal (the video signal) input from the controller 103.

It should be noted that the engine 107 may apply any of an electrophotographic system, an inkjet system, a dye sublimation system, and other printing system.

FIGS. 2A, 2B and 2C are diagrams showing an example of data transition in a case where the controller 103 shown in FIG. 1 expands the printing data into the raster data.

FIG. 2A shows the printing data. As the printing data corresponding to a straight line on drawing coordinates, data which designates a start point (3, 1), an end point (1, 4) and a line width is included.

FIG. 2B shows run-length data which is obtained by converting the printing data of FIG. 2A. The run-length data represents the printing data with a left point (xL) and a right point (xR) of a main scan direction for every main scanning.

FIG. 2C shows the raster data which is obtained by expanding the run-length data of FIG. 2B. The raster data is an aggregation of pixels (dots).

Figure 3B:
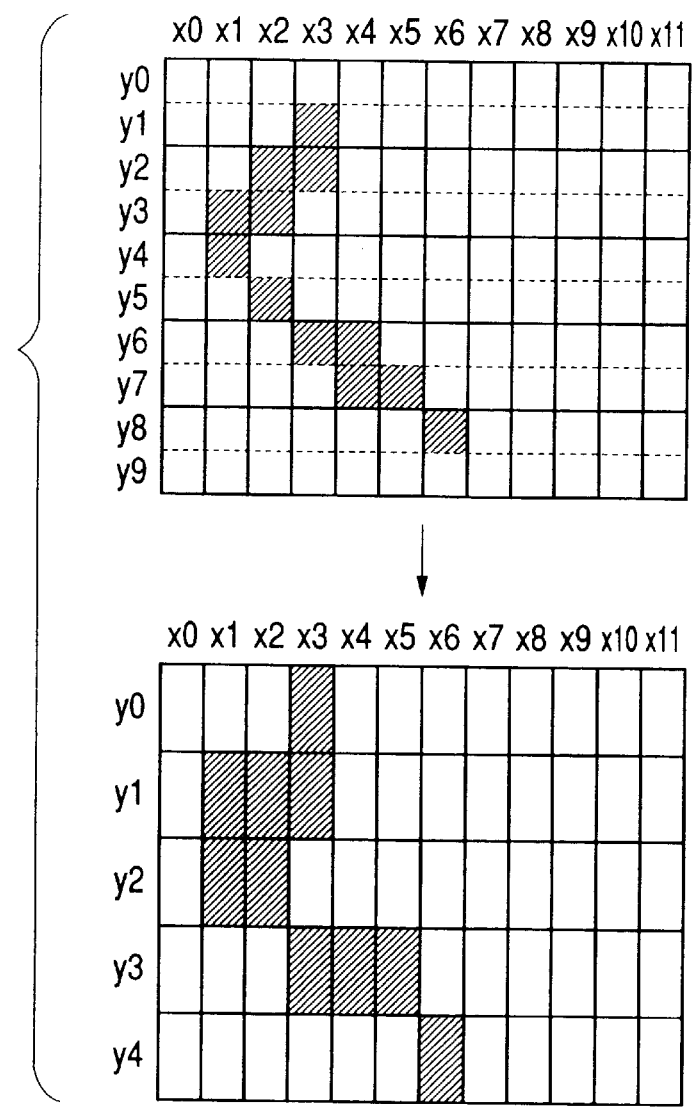

FIGS. 3A and 3B are diagrams showing a first pixel conversion (integration (or unification)) concept of the printing apparatus according to the present invention.

FIG. 3A shows a pixel integration rule in a case where a multiple-speed number of printing speed is set to be "2" (i.e., double-speed printing). When two pixels aligned with the sub scanning direction are converted (integrated) into one pixel, this pixel integration rule corresponds to a case where the pixel value posterior to the conversion is pursuant to the pixel value occupying more than half the number within an extraction area.

At this time, a threshold value (half the number within the extraction area) to determine the pixel value posterior to the conversion is one pixel (two pixels×½). Thus, if both the two pixels are "off", a signal becomes "off", while if there is as much as one pixel of "on", the signal becomes "on". When the raster data is converted according to this pixel integration rule, the resolution of the sub scanning direction is "½".

FIG. 3B shows a printed result in a case where the resolution of the sub scanning direction is converted into "½" according to the pixel integration rule of FIG. 3A.

Hereinafter, resolution conversion printing processing by the printing apparatus according to the present invention will be explained with reference to FIGS. 4, 5 and 6.

Figure 4:
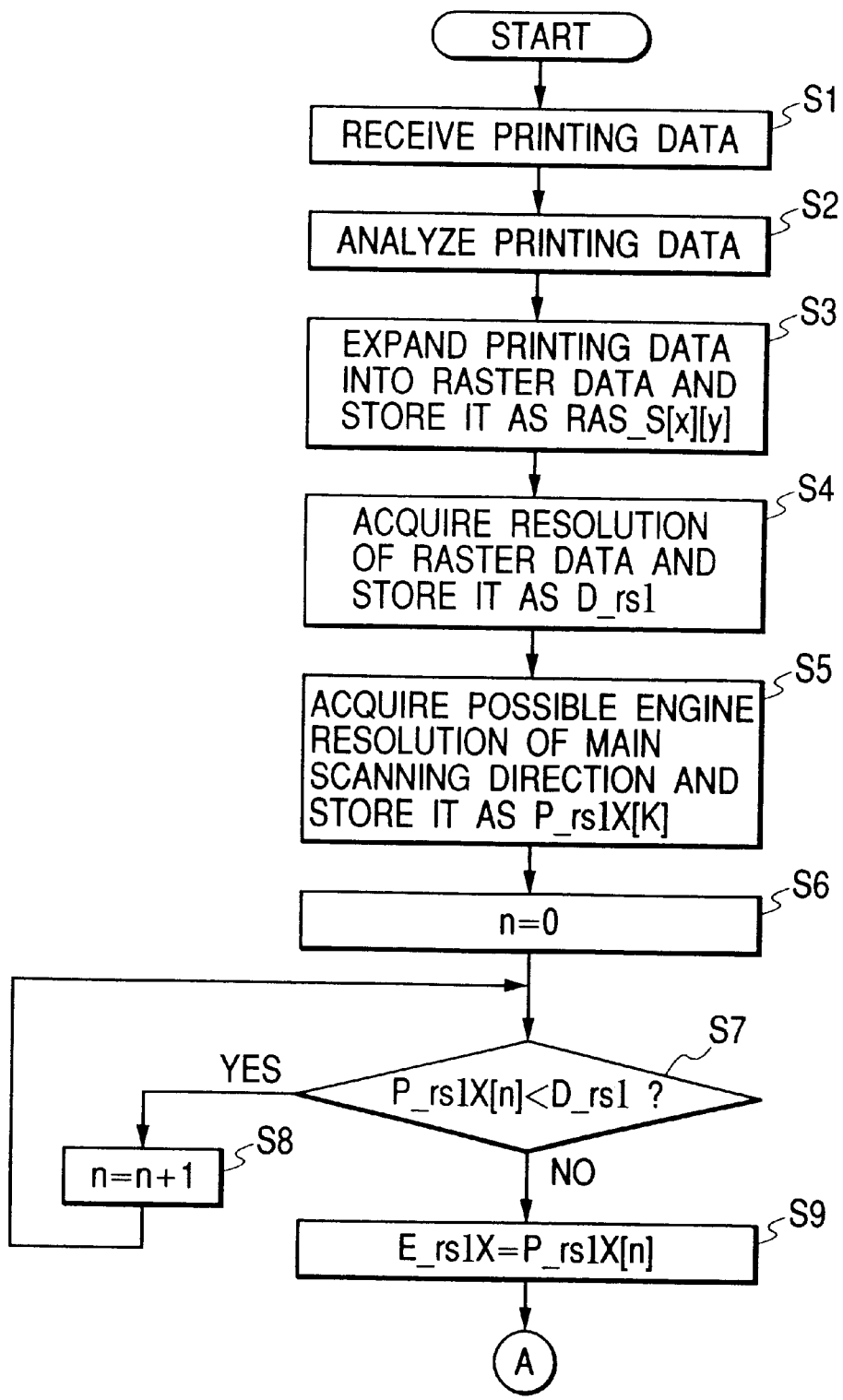
FIG. 4 is a flow chart showing a first control program of the printing apparatus according to the present invention.
Figure 5:
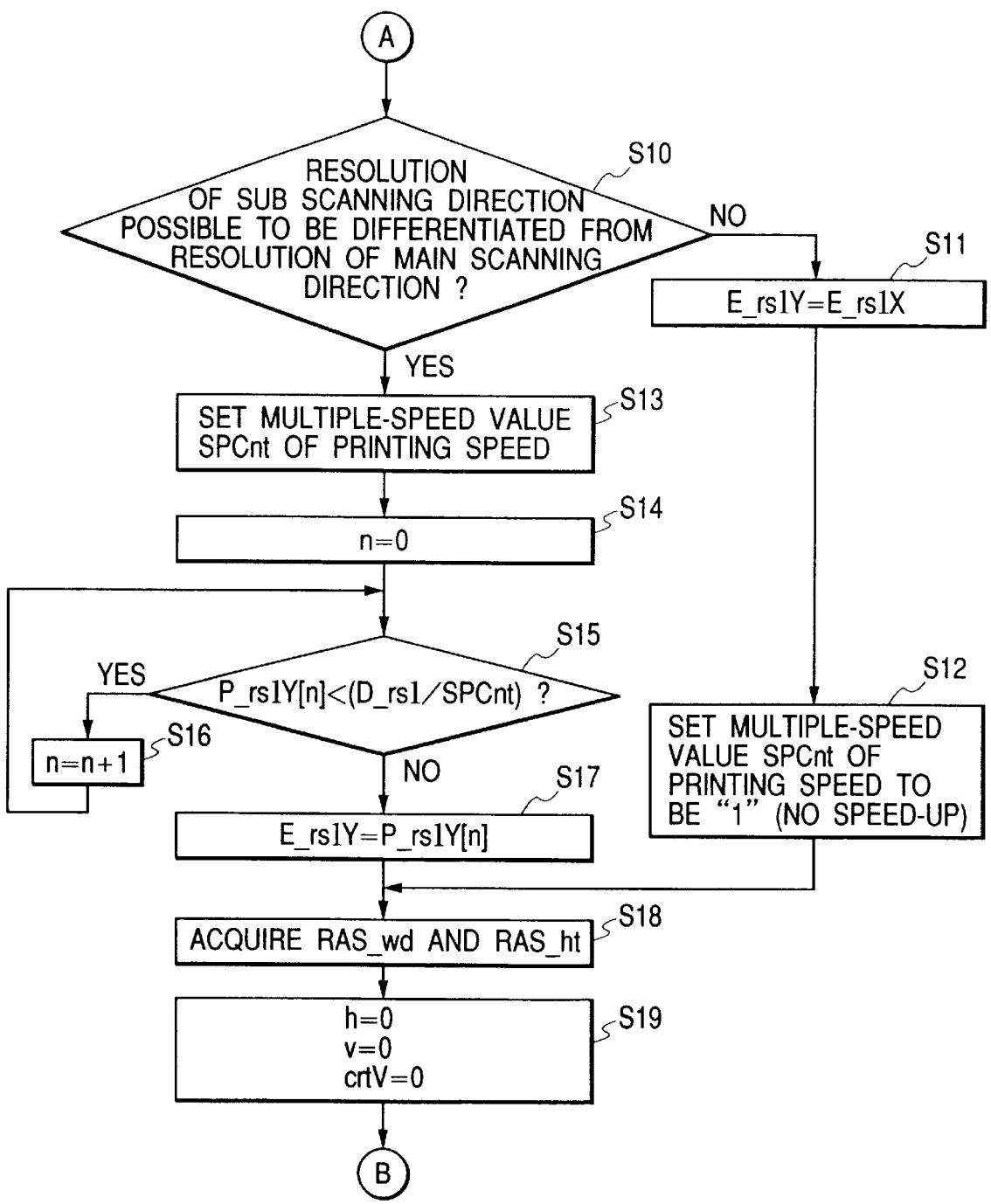
FIG. 5 is a flow chart showing the first control program of the printing apparatus according to the present invention.
Figure 6:
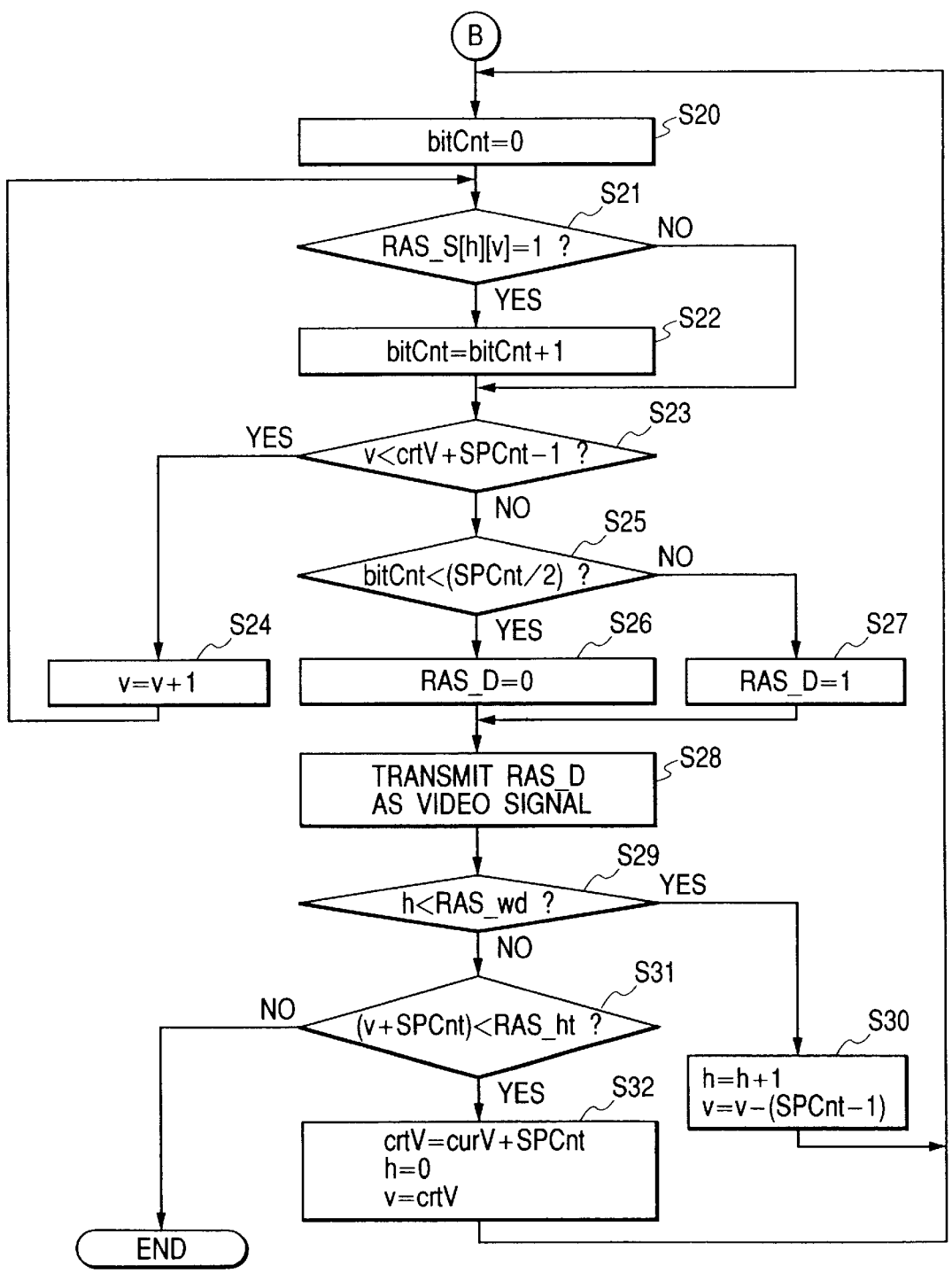
FIG. 6 is a flow chart showing the first control program of the printing apparatus according to the present invention.

FIGS. 4 to 6 are flow charts showing a first control program of the printing apparatus according to the present invention. The first control program corresponds to first resolution conversion printing processing by the printing apparatus according to the present invention. The first resolution conversion printing processing is performed by the CPU 104 of FIG. 1 on the basis of the program stored in the ROM 105.

First, in a step S1, the printing data is received from the host computer 101. In a step S2, the received printing data is analyzed by the drawing analysis unit 103 of the printer 102. In a step S3, the analyzed printing data is expanded into the raster data with the resolution designated by the host computer 101, and this raster data is stored as RAS_S[x][y] (x represents a pixel number in the main scanning direction, and y represents a pixel number in the sub scanning direction).

Next, in a step S4, the resolution of the raster data expanded in the step S3 is acquired and stored as D_rsl.

In a step S5, an engine resolution of the main scanning direction which can be taken by the engine 107 is acquired from the ROM 105, and the taken engine resolution (also called a possible engine resolution) is stored as P_rslX[K] (K represents the number of values capable of being taken, and the data is stored in ascend order).

Next, in a step S6, a variable n is initialized. In a step S7, the engine resolution P_rslX[n] capable of being set (also called the possible engine resolution) is compared with the data resolution D_rsl. When it is judged that D_rsl is larger than P_rslX[n], then the variable n is incremented by one in a step S8 to acquire a next-possible engine resolution, and the flow returns to the step S7.

Conversely, when it is judged in the step S7 that the data resolution D_rsl is not larger than the possible engine resolution P_rslX[n] (i.e., D_rsl≦P_rslX[n]), then the possible engine resolution P_rslX[n] is set to an engine resolution E_rslX of the main scanning direction, thereby performing the setting to the engine 107.

Next, in a step S10, it is judged whether or not the resolution different from that of the main scanning direction can be set for the sub scanning direction. When judged that such the different resolution can not be set, in a step S11 the same value as the resolution E_rslX of the main scanning direction is set for the engine 107 as a resolution E_rslY of the sub scanning direction. Also, in a step S12, a multiple-speed value SPCnt of the printing speed is set for the engine 107 as "1" (no speed-up), and the flow advances to a step S18.

Conversely, when it is judged in the step S10 that the resolution different from that of the main scanning direction can be set for the sub scanning direction, in a step S13 a multiple-speed value of the printing speed desired by a user (indicated from the host computer 101) is set as the multiple-speed value SPCnt.

Next, in a step S14, the variable n is initialized. In a step S15, the possible engine resolution P_rslY[n] is compared with the quotient of the data resolution D_rsl divided by the multiple-speed value SPCnt of the printing speed (i.e., D_rsl/SPCnt). When it is judged that D_rsl/SPCnt is larger than P_rslY[n], then the variable n is incremented by one in a step S16 to acquire a next-possible resolution, and the flow returns to the step S15.

Conversely, when it is judged in the step S15 that D_rsl/SPCnt is not larger than P_rslY[n] (i.e., P_rslY[n]≧D_rsl/SPCnt), in a step S17 the possible engine resolution P_rslY[n] is set to an engine resolution E_rslY of the sub scanning direction.

Next, in a step S18, a width (RAS_wd) and a height (RAS_ht) of the expanded raster data are acquired. In a step S19, variables h (main scanning direction) and v (sub scanning direction) used to designate a pixel position of the raster data and a position crtV of a currently processed sub scanning line are initialized.

Next, in a step S20, a variable bitCnt for storing the number of "on" pixels within a pixel extraction area is initialized.

In a step S21, the main scanning direction is assumed to be an x coordinate (the position h), and the sub scanning direction is assumed to be a y coordinate (the position v). Then it is judged whether or not a pixel value RAS_S[h][v] at this time is "on" (i.e., RAS_S[h][v]=1). When it is judged that the value RAS_S[h][v] is "off" (i.e., RAS_S[h][v]=1 is not satisfied), the flow advances to a step S23. Conversely, when it is judged that the value RAS_S[h][v] is "on" (i.e., RAS_S[h][v]=1), in a step S22 the variable bitCnt representing the number of "on" pixels within the pixel extraction area is incremented by one.

Next, when the multiple-speed value of the printing speed is SPCnt, the number of pixels corresponding to the value SPCnt on the sub scanning line is counted for one video signal. Thus, in the step S23, it is judged how many the target line is. Namely, while the number of pixels within the pixel extraction area is being counted, it is judged whether or not v<crtV+SPCnt−1. When it is judged in the step S23 that v<crtV+SPCnt−1 during the counting within the pixel extraction area, the variable v representing the pixel position in the sub scanning direction is incremented by one in a step S24, a next pixel position on the sub scanning line is set to be v, and the flow returns to the step S21.

Conversely, when it is judged in the step S23 that counting of the value SPCnt of the sub scanning direction (within the pixel extraction area) ends (i.e., v<crtV+SPCnt−1 is not satisfied), then it is judged in a step S25 whether or not the number of "on" pixels exceeds half the number of all pixels within the pixel extraction area (i.e., bitCnt<(SPCnt/2)). When it is judged that the number of "on" pixels does not exceed half the number of all pixels within the pixel extraction area (i.e., bitCnt<(SPCnt/2)), in a step S26 the pixel value in a case where the pixel extraction area is considered as one pixel is set to be "off". Namely, "0" is set to raster data RAS_D obtained by integrating the plural pixels of the sub scanning direction to one pixel, and the flow advances to a step S28.

Conversely, when it is judged in the step S25 that the number of "on" pixels exceeds half the number of all pixels within the pixel extraction area (i.e., bitCnt<(SPCnt/2) is not satisfied), in a step S27 the pixel value in the case where the pixel extraction area is considered as one pixel is set to be "on". Namely, "1" is set to the raster data RAS_D obtained by integrating the plural pixels of the sub scanning direction to one pixel, and the flow advances to the step S28.

Next, in the step S28, the raster data RAS_D obtained by integrating the plural pixels of the sub scanning direction to one pixel is transmitted as the video signal to the engine 107.

Next, in a step S29, it is judged whether or not a final position of the main scanning direction was processed (i.e., h<RAS_wd). When it is judged that the final position is not processed yet (i.e., h<RAS_wd), then in a step S30 the variable h representing the pixel position of the main scanning direction is incremented by one to set a pixel position on a next main scanning line to be h, and the variable v representing the pixel position of the sub scanning direction is returned to the head of a next area (v=v−(SPCnt−1)). Namely, the pixel extraction area is dislocated in the main scanning direction, and the flow returns to the step S20 to repeat the counting to a next pixel extraction area.

Conversely, when it is judged in the step S29 that the final position was processed (i.e., h<RAS_wd is not satisfied), then it is judged in a step S31 whether or not a final position of the sub scanning direction was processed (i.e., (v+SPCnt) <RAS_ht). When it is judged that the final position is not processed yet (i.e., (v+SPCnt)<RAS_ht), then in a step S32 the currently processed sub scanning line position is shifted to the head of a next pixel extraction area (crtV=curV+ SPCnt). Also, the variables h and v respectively representing the main and sub scanning directions are initialized (h=0, v=crtV), and the flow returns to the step S20.

Conversely, when it is judged in the step S31 that the final position of the sub scanning direction was processed (i.e., (v+SPCnt)<RAS_ht is not satisfied), the processing ends.

The set of steps S10 to S32 corresponds to sub-scanning-direction resolution conversion output processing. In this processing, according to the number of multiple speed N of the engine speed, the resolution of the sub scanning direction is set to be Y=X/N, the N pixels aligned with the sub scanning direction are considered as one pixel, and the video signal is transmitted to the engine 107.

The set of steps S20 to S32 corresponds to the first pixel integration processing. In this processing, according to the number of "on" (or "off") pixels existing within the 1×N area of the expanded raster data, "on" (or "off") of the pixel is determined.

By the above processing, in the monochrome printing apparatus capable of performing the printing in the main and sub scanning directions with different resolutions, in a case where the multiple speed N of the printing speed is desired for the resolution-designated data X, when the raster data expanded as the high-resolution data is transmitted as the video signal to the engine, the main scanning direction is set to be "X" like the data resolution. According to the number of multiple speed N of the engine speed, the resolution of the sub scanning direction is set to be Y=X/N. Also, the N pixels aligned with the sub scanning direction are considered as one pixel, and the video signal in which "on" (or "off") of the pixel is determined according to the number of "on" (or "off") pixels existing within the 1×N area of the expanded raster data is transmitted to the engine. Thus, it is possible to perform the output in image quality higher than that in a case where both the main and sub scanning directions are set to be low resolution at the printing speed higher than that in a case where both the main and sub scanning directions are set to be high resolution.

Second Embodiment

In the above first embodiment, the case where the plural pixels of the sub scanning direction are considered as one pixel and converted, and then the obtained pixel value is pursuant to the pixel value occupying more than half the number within the extraction area was explained. Further, when the number of "on" pixels is the same as the number of "off" pixels within the extraction area, the pixel value posterior to the conversion can be determined according to pixel distribution positions of the extraction area.

Figure 7A:
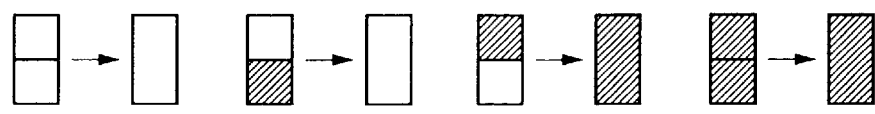
FIGS. 7A and 7B are diagrams showing a second pixel conversion (integration) concept of the printing apparatus according to the present invention.
Figure 7B:
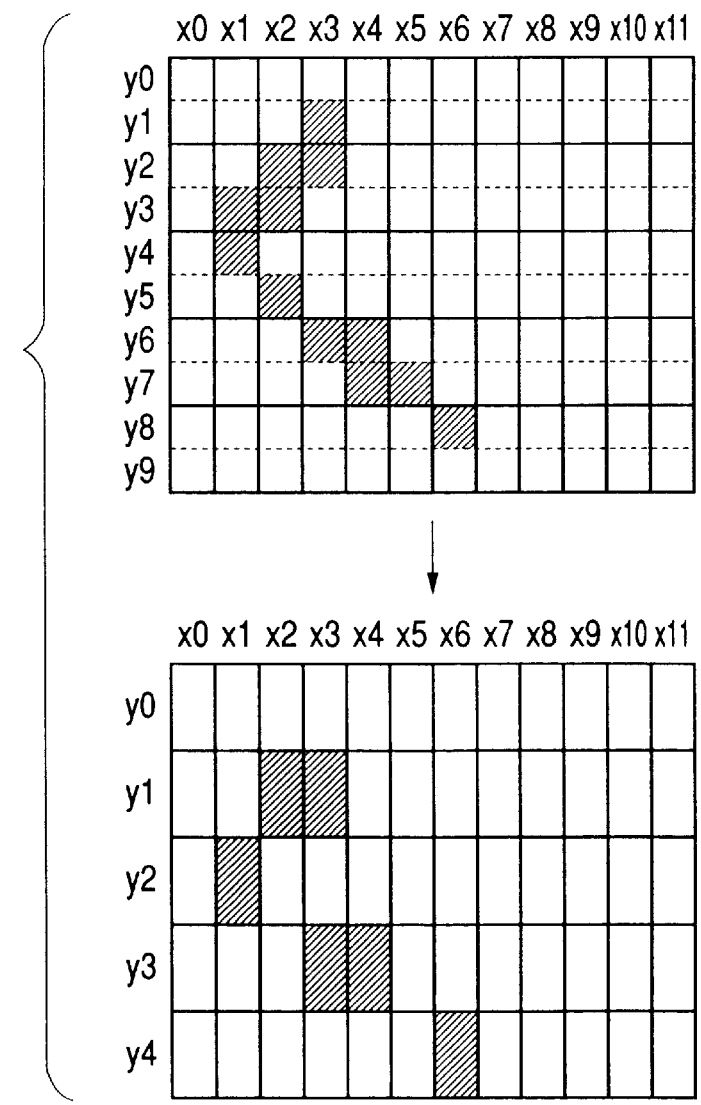

FIGS. 7A and 7B are diagrams showing a second pixel conversion (integration (or unification)) concept of the printing apparatus according to the present invention.

FIG. 7A shows a pixel integration rule in a case where a multiple-speed number of printing speed is set to be "2" (i.e., double-speed printing). When two pixels aligned with the sub scanning direction are converted (integrated) into one pixel, this pixel integration rule corresponds to a case where the pixel value posterior to the conversion is pursuant to the pixel value occupying more than half the number within an extraction area. When the number of "on" pixels is the same as the number of "off" pixels, this pixel integration rule corresponds to the case where the pixel value posterior to the conversion is determined according to the pixel distribution positions of the extraction area.

When the pixel value posterior to the conversion is determined according to the values of the pixels occupying more than half the number within the extraction area, a threshold value (half the number within the extraction area) of the pixel number is one pixel (two pixels×½) here. Thus, if both the two pixels are "off", a signal becomes "off", while if there is as much as one pixel of "on", the signal becomes "on". When the number of "on" pixels is the same as the number of "off" pixels, if the signal is always converted into either "on" or "off", there is a possibility that a density difference between the image posterior to the conversion and a former image grows.

Thus, when the number of "on" (or "off") pixels within the upper half range of the extraction area is larger than the number of "on" (or "off") pixels within the lower half range, the signal is set to be "on" (or "off"). Conversely, when the number of "on" (or "off") pixels within the upper half range of the extraction area is smaller than the number of "on" (or "off") pixels within the lower half range, the signal is set to be "off" (or "on"). Thus, the signal is determined according to the pixel distribution positions of the extraction area. By converting raster data according to the pixel integration rule shown in FIG. 7A, the resolution of the sub scanning direction is set to be "½".

FIG. 7B shows a printed result which is obtained when the resolution of the sub scanning direction is set to be "½" according to the pixel integration rule shown in FIG. 7A.

Hereinafter, resolution conversion printing processing by the printing apparatus according to the present invention will be explained with reference to FIGS. 8 and 9.

Figure 8:
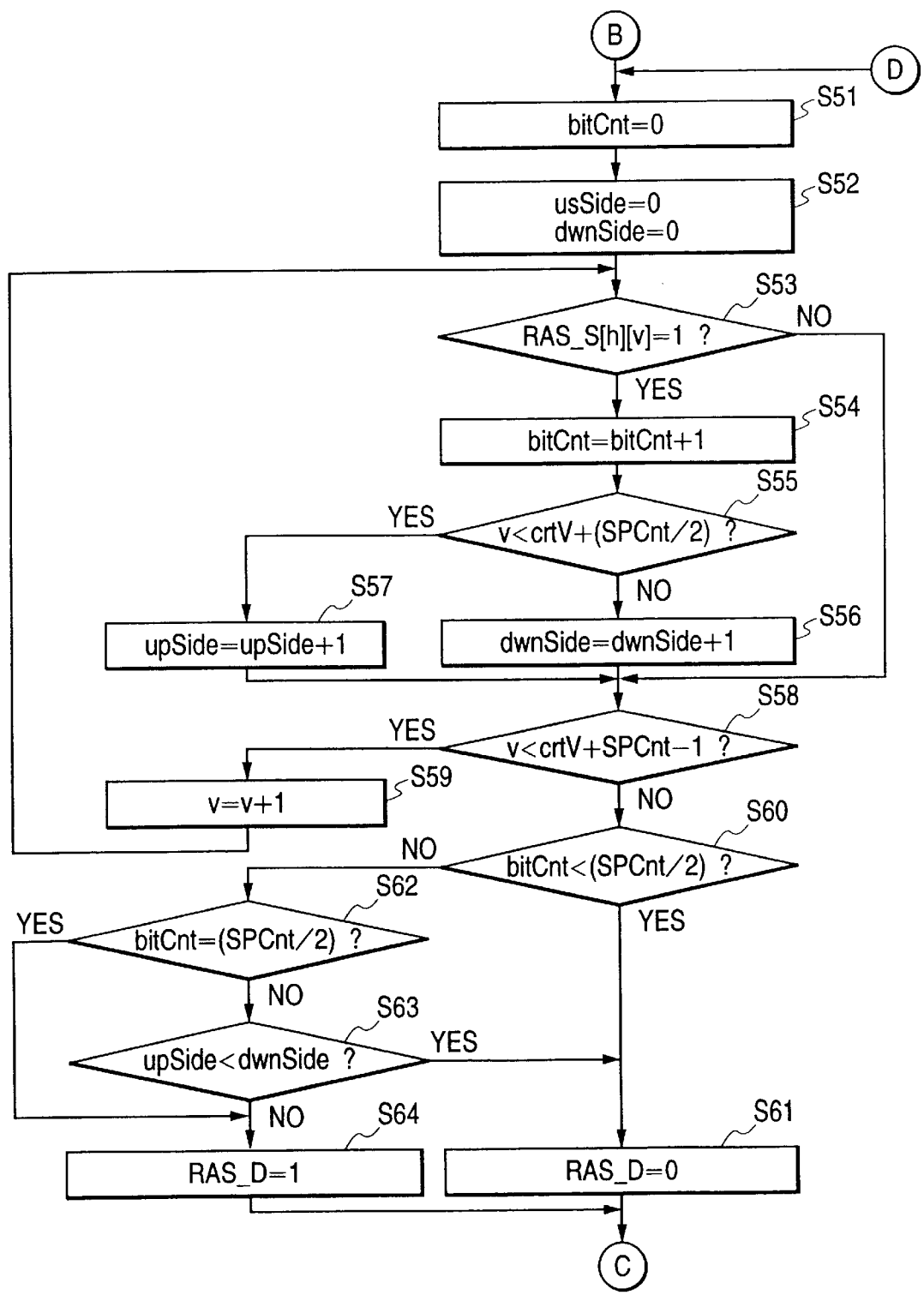
FIG. 8 is a flow chart showing a second control program of the printing apparatus according to the present invention.
Figure 9:
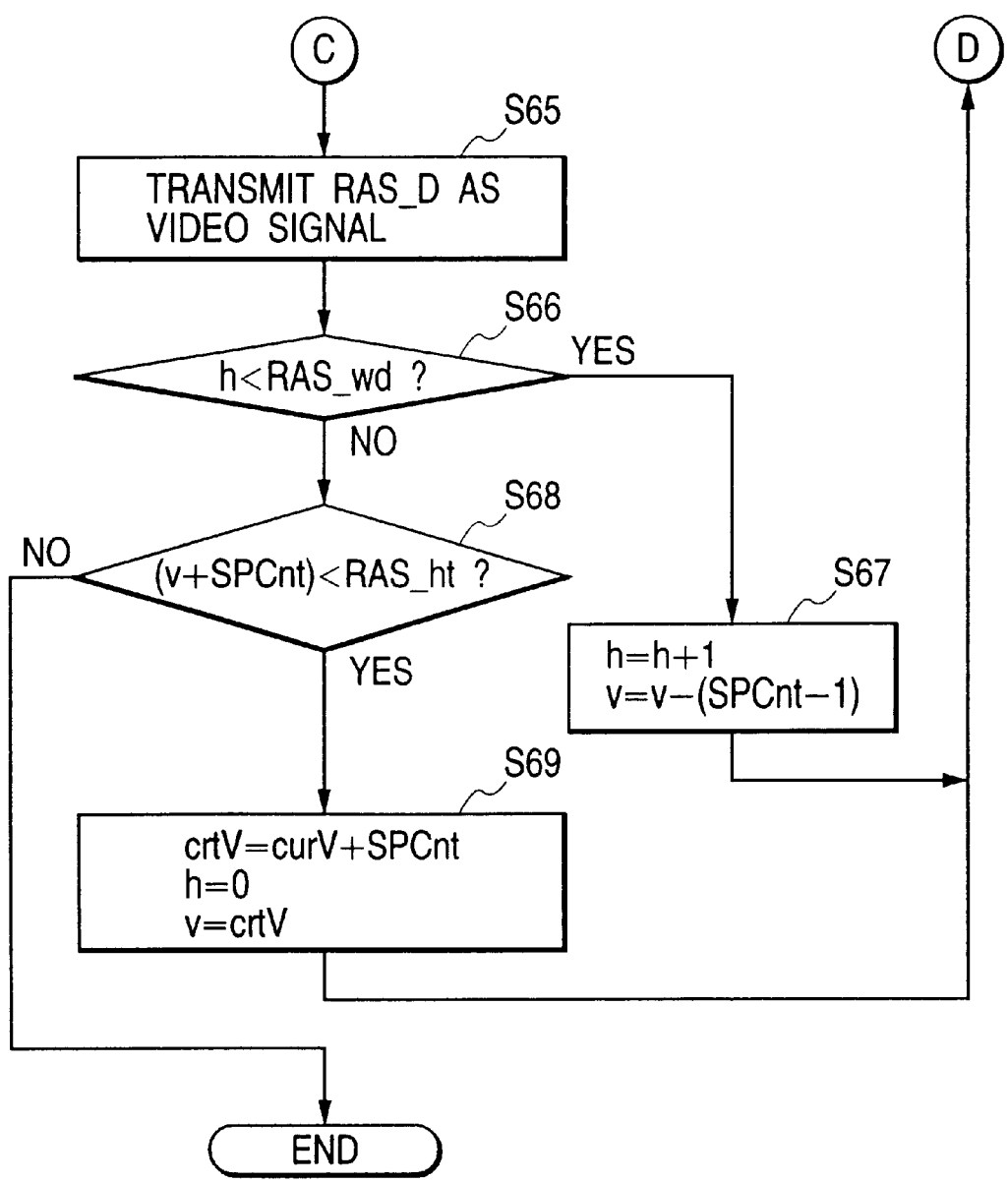
FIG. 9 is a flow chart showing the second control program of the printing apparatus according to the present invention.

FIGS. 8 and 9 are flow charts showing a second control program of the printing apparatus according to the present invention. The second control program corresponds to second resolution conversion printing processing by the printing apparatus according to the present invention. Further, the second control program is executed subsequent to the setting processing for the resolutions of the main and sub scanning directions in the steps S1 (FIG. 4) to S19 (FIG. 5), the acquirement processing for the width (RAS_wd) and height (RAS_ht) of the raster data, and the initialization processing for the variables h (main scanning direction) and v (sub scanning direction) used to designate the pixel position of the raster data and the position crtV of the currently processed sub scanning line. The processing shown in FIGS. 8 and 9 is performed by the CPU 104 of FIG. 1 on the basis of the program stored in the ROM 105.

When the engine resolution setting processing of the main scanning direction, the multiple speed setting processing, the engine resolution setting processing of the sub scanning direction, the acquirement processing for the width (RAS_wd) and height (RAS_ht) of the raster data, and the initialization processing for the position crtV of the currently processed sub scanning line in the steps S1 (FIG. 4) to S19 (FIG. 5) end, next in a step S51 the variable bitCnt representing the number of "on" pixels within the pixel extraction area is initialized.

Next, in a step S52, a variable upside representing the number of "on" pixels within the upper half range of the extraction area and a variable dwnSide representing the number of "on" pixels within the lower half range of the extraction area are initialized.

In a step S53, the main scanning direction is assumed to be an x coordinate (the position h), and the sub scanning direction is assumed to be a y coordinate (the position v). Then it is judged whether or not the pixel value RAS_S[h][v] at this time is "on" (i.e., RAS_S[h][v]=1). When it is judged that the pixel value RAS_S[h][v] is "off" (i.e., RAS_S[h][v]=1 is not satisfied), the flow advances to a step S58 as it is. Conversely, when it is judged that the value RAS_S[h][v] is "on" (i.e., RAS_S[h][v]=1), in a step S54 the variable bitCnt representing the number of "on" pixels within the pixel extraction area is incremented by one.

Next, it is judged in a step S55 whether the current position is within the upper range in the extraction area (i.e., v<crtV+(SPCnt/2)) or within the lower range. When it is judged that the current position is within the upper range (v<crtV+(SPCnt/2)), then in a step S57 the variable upside representing the number of "on" pixels within the upper range of the extraction area is incremented by one, and the flow advances to the step S58. Conversely, when it is judged that the current position is within the lower range (v<crtV+(SPCnt/2) is not satisfied), then in a step S56 the variable dwnside representing the number of "on" pixels within the lower range of the extraction area is incremented by one, and the flow advances to the step S58.

When the multiple-speed value of the printing speed is SPCnt, the number of pixels corresponding to the value SPCnt on the sub scanning line is counted for one video signal. Thus, in the step S58, it is judged how many the target line is. Namely, while the number of pixels within the pixel extraction area is being counted, it is judged whether or not v<crtV+SPCnt−1. When it is judged that v<crtV+SPCnt−1 during the counting within the pixel extraction area, the variable v representing the pixel position of the sub scanning direction is incremented by one in a step S59, and the flow returns to the step S53.

Conversely, when it is judged in the step S58 that counting of the value SPCnt of the sub scanning direction (within the pixel extraction area) ends (i.e., v<crtV+SPCnt−1 is not satisfied), then it is judged in a step S60 whether or not the number of "on" pixels exceeds half the number of all pixels within the pixel extraction area (i.e., bitCnt<(SPCnt/2)). When it is judged that the number of "on" pixels does not exceed half the number of all pixels within the pixel extraction area (i.e., bitCnt<(SPCnt/2)), in a step S61 the pixel value in a case where the pixel extraction area is considered as one pixel is set to be "off". Namely, "0" is set to raster data RAS_D obtained by integrating the plural pixels of the sub scanning direction to one pixel, and the flow advances to a step S65.

Conversely, when it is judged in the step S60 that the number of "on" pixels exceeds half the-number of all pixels within the pixel extraction area (i.e., bitCnt<(SPCnt/2) is not satisfied), it is judged in a step S62 whether or not the number of "on" pixels within the pixel extraction area is the same as the number of "off" pixels (i.e., bitCnt=(SPCnt/2)). When it is judged that the number of "on" pixels is the same as the number of "off" pixels (i.e., bitCnt=(SPCnt/2)), in a step S64 the pixel value in the case where the pixel extraction area is considered as one pixel is set to be "on". Namely, "1" is set to the raster data RAS_D obtained by integrating the plural pixels of the sub scanning direction to one pixel, and the flow advances to the step S65.

Conversely, when it is judged in the step S62 that the number of "on" pixels is not the same as the number of "off" pixels, then it is judged in a step S63 whether there are a lot of "on" pixels within the lower range of the extraction area (i.e., upside<dwnSide) or within the upper range. When it is judged that there are a lot of "on" pixels within the lower range (i.e., upside<dwnSide), in the step S61 the pixel value in the case where the pixel extraction area is considered as one pixel is set to be "off". Namely, "0" is set to the raster data RAS_D obtained by considering the plural pixels of the sub scanning direction as one pixel, and the flow advances to the step S65.

Conversely, when it is judged in the step S63 that there are a lot of "on" pixels within the upper range (i.e., upside<dwnSide is not satisfied), in the step S64 the pixel value in the case where the pixel extraction area is considered as one pixel is set to be "on". Namely, "1" is set to the raster data RAS_D obtained by considering the plural pixels of the sub scanning direction as one pixel, and the flow advances to the step S65.

Next, in the step S65, the raster data RAS_D obtained by considering the plural pixels of the sub scanning direction as one pixel is transmitted as the video signal to the engine 107.

Next, in a step S66, it is judged whether or not a final position of the main scanning direction was processed (i.e., h<RAS_wd). When it is judged that the final position is not processed yet (i.e., h<RAS_wd), then in a step S67 the variable h representing the pixel position of the main scanning direction is incremented by one to set a pixel position on a next main scanning line to be h, and the variable v representing the pixel position of the sub scanning direction is returned to the head of a next area (v=v−(SPCnt−1)). Namely, the pixel extraction area is dislocated by one pixel in the main scanning direction, and the flow returns to the step S51 to repeat the counting to the next area.

Conversely, when it is judged in the step S66 that the final position was processed (i.e., h<RAS_wd is not satisfied), then it is judged in a step S68 whether or not a final position of the sub scanning direction was processed (i.e., (v+SPCnt)<RAS_ht). When it is judged that the final position is not processed yet (i.e., (v+SPCnt)<RAS_ht), then in a step S69 the currently processed sub scanning line position is shifted to the head of the next pixel extraction area (crtV=curV+SPCnt). Also, the variables h and v are initialized (h=0, v=crtV), and the flow returns to the step S51.

Conversely, when it is judged in the step S68 that the final position of the sub scanning direction was processed (i.e., (v+SPCnt)<RAS_ht is not satisfied), the processing ends.

The set of steps S52 to S64 corresponds to the second pixel integration processing. In this processing, when the number of "on" (of "off") pixels is the identical, "on" (or "off") of one pixel with the resolution posterior to the conversion is determined according to the positions of "on"

(or "off") pixels within the area, thereby preventing density deflection (or bias).

By the above processing, in the monochrome printing apparatus capable of performing the printing in the main and sub scanning directions with different resolutions, in a case where the multiple speed N of the printing speed is desired for the resolution-designated data X, when the raster data expanded as the high-resolution data is transmitted as the video signal to the engine, the main scanning direction is set to be "X" like the data resolution. According to the number of multiple speed N of the engine speed, the resolution of the sub scanning direction is set to be Y=X/N, and the N pixels aligned with the sub scanning direction are considered as one pixel. Then, the number of "on" (or "off") pixels existing within "1×N" area (i.e., the area composed of N pixels aligned with the sub scanning direction) of the expanded raster data is determined. Further, when the number of "on" (of "off") pixels is the identical, "on" (or "off") of one pixel with the resolution posterior to the conversion is determined according to the positions of "on" (or "off") pixels within the area. Thus, it is possible to output the image of which quality is higher than that in a case where both the main and sub scanning directions are set to be low resolution without any density deflection (or bias) at the printing speed higher than that in a case where both the main and sub scanning directions are set to be high resolution.

In FIGS. 3A, 3B, 7A and 7B, it was explained the case where the multiple-speed number of printing speed is set to be "2", the two pixels aligned with the sub scanning direction are considered as one pixel, and the video signal is transmitted to the engine 107. However, it is possible to set the multiple-speed number of printing speed to be "3" or more, consider the three or more pixels aligned with the sub scanning direction as one pixel, and transmit the video signal to the engine 107.

Third Embodiment

In the above first and second embodiments, the case where the finally output image is the binary image for each pixel was explained. Hereinafter, the third embodiment in which the present invention is applied to a printing apparatus capable of outputting multivalue image for each pixel will be explained.

Figure 10A:
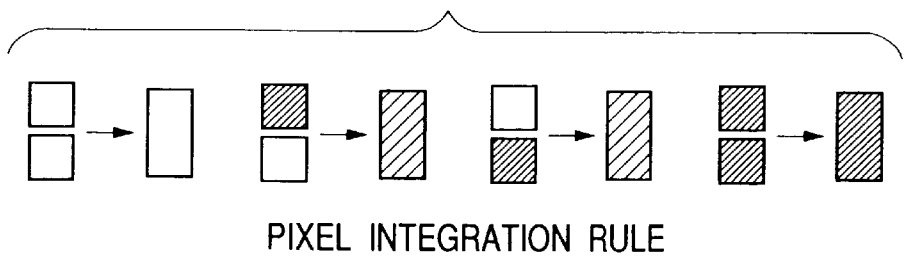
FIGS. 10A and 10B are diagrams showing a third pixel conversion (integration) concept of the printing apparatus according to the present invention.
Figure 10B:
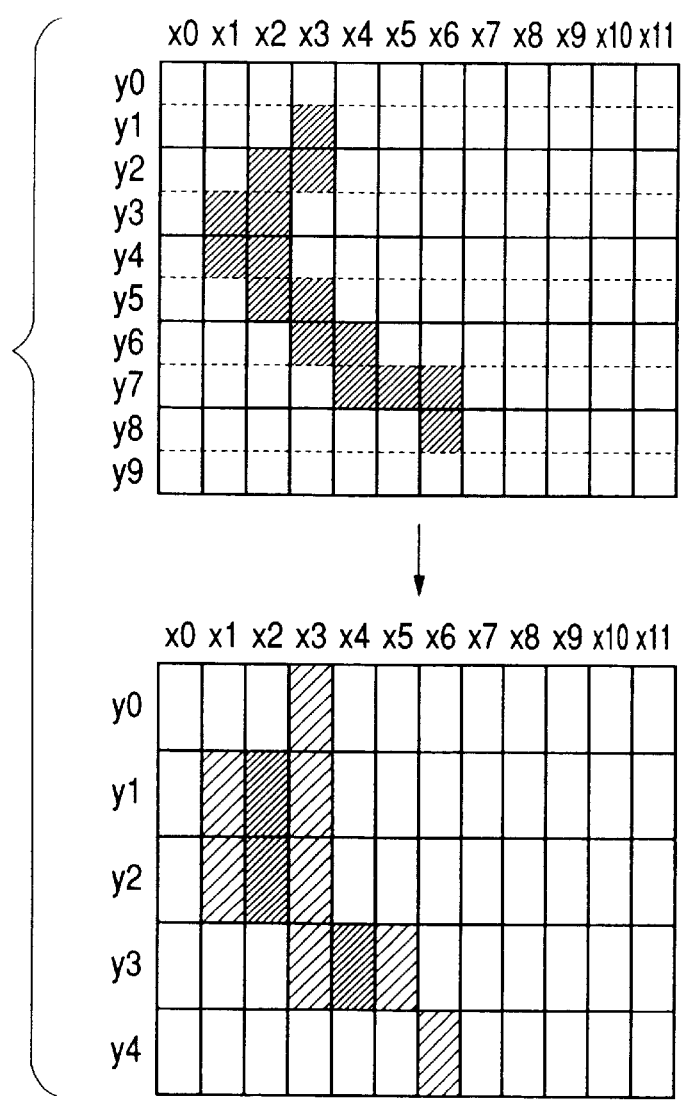

FIGS. 10A and 10B are diagrams showing a third pixel conversion (integration (or unification)) concept of the printing apparatus according to the present invention. The present embodiment will be explained on the premise that image data prior to pixel conversion (called an original image or a former image) has been binarized by a dither method, an error diffusion method or the like.

A multiple-speed number of printing speed is given SPCnt, the number of gradations capable of being represented for each pixel by the printing apparatus is given depth, the number of pixels within the unit area (1×A) of the original image is given C, and a density S of the original image (i.e., the number of lighting (black) pixels within the area) is made to correspond to a density D posterior to the conversion. Concretely, when STH=SPCnt/depth (hereinafter STH is called a division reference value), a value of n satisfying STH×n≦S<STH×(n+1) is given D. However, when S=C (all the pixels within the area are lighting (black)), D=B−1 (maximum density).

FIG. 10A shows an example of SPCnt=2, depth=4, and C=2. At this time, the correspondence between the densities D and S is as follows:

when S=0, since 0≦S<0.5 (n=0), then D=0;
when S=1, since 1.0≦S<1.5 (n 2), then D=2; and
when S=2, since S=C, then D=3 (maximum density).

FIG. 10B shows a printed result in a case where the resolution of the sub scanning direction is converted into "½" according to the above rule shown in FIG. 10A.

Figure 11:
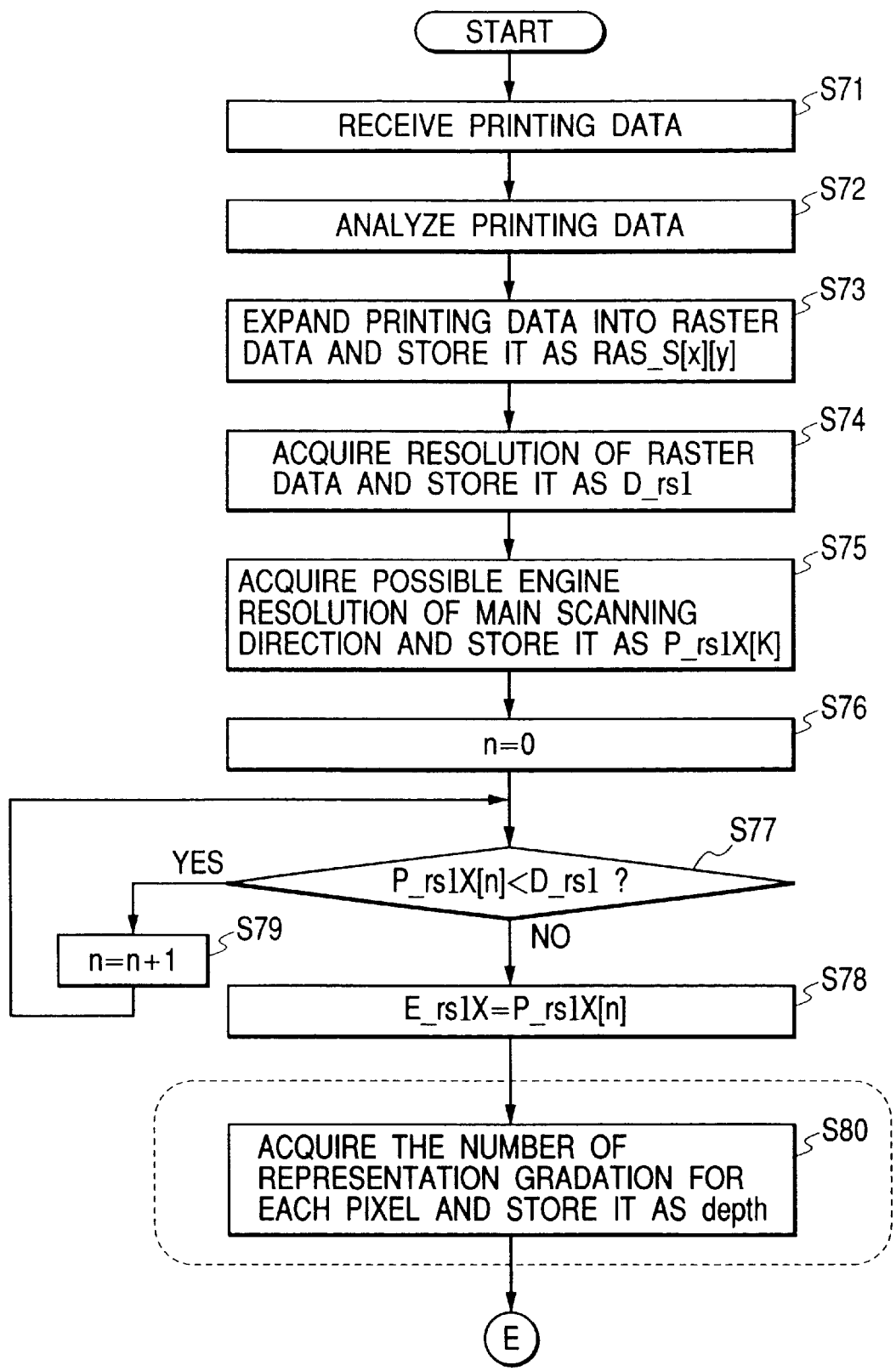
FIG. 11 is a flow chart showing a third control program of the printing apparatus according to the present invention.
Figure 12:
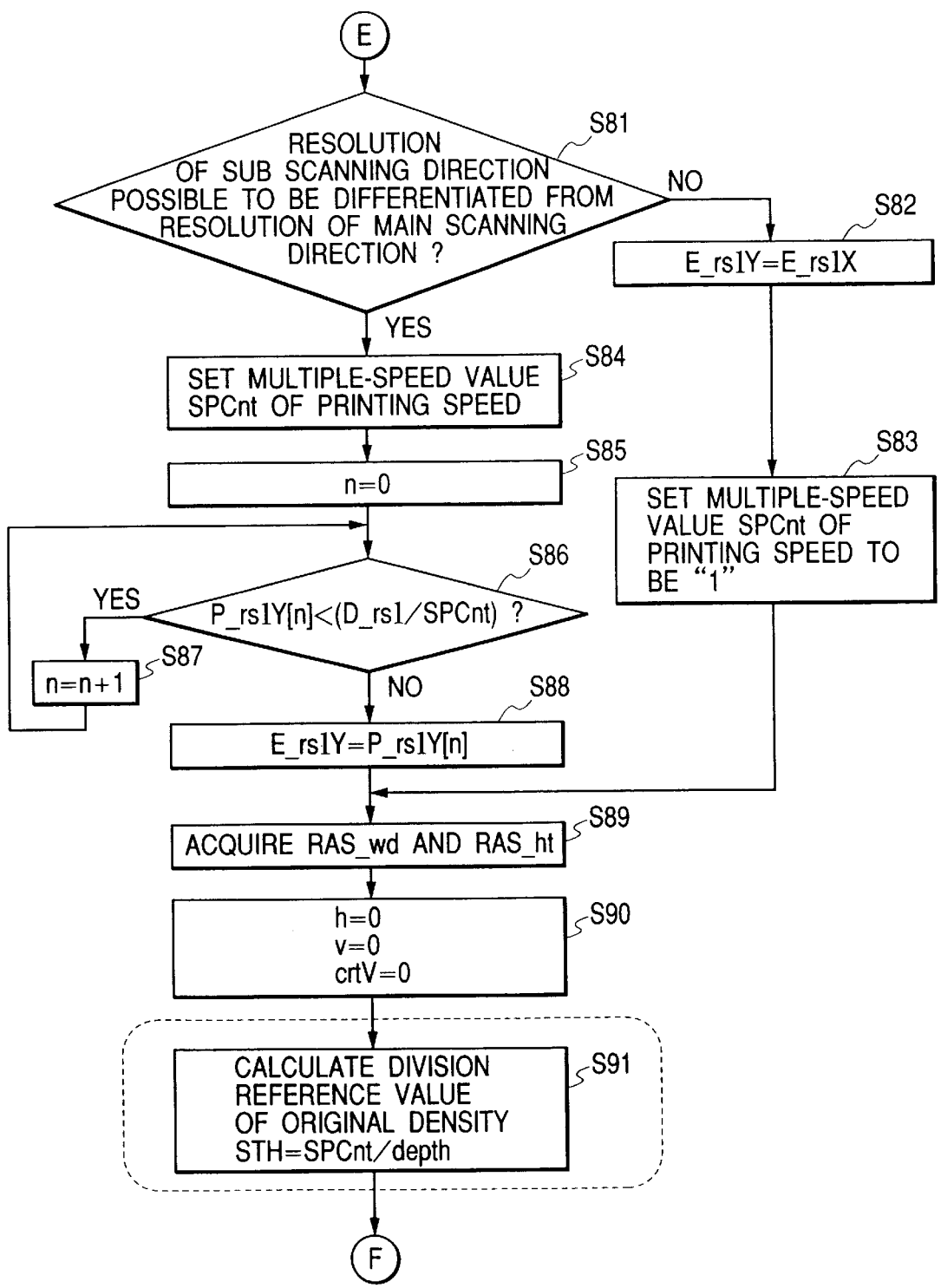
FIG. 12 is a flow chart showing the third control program of the printing apparatus according to the present invention.
Figure 13:
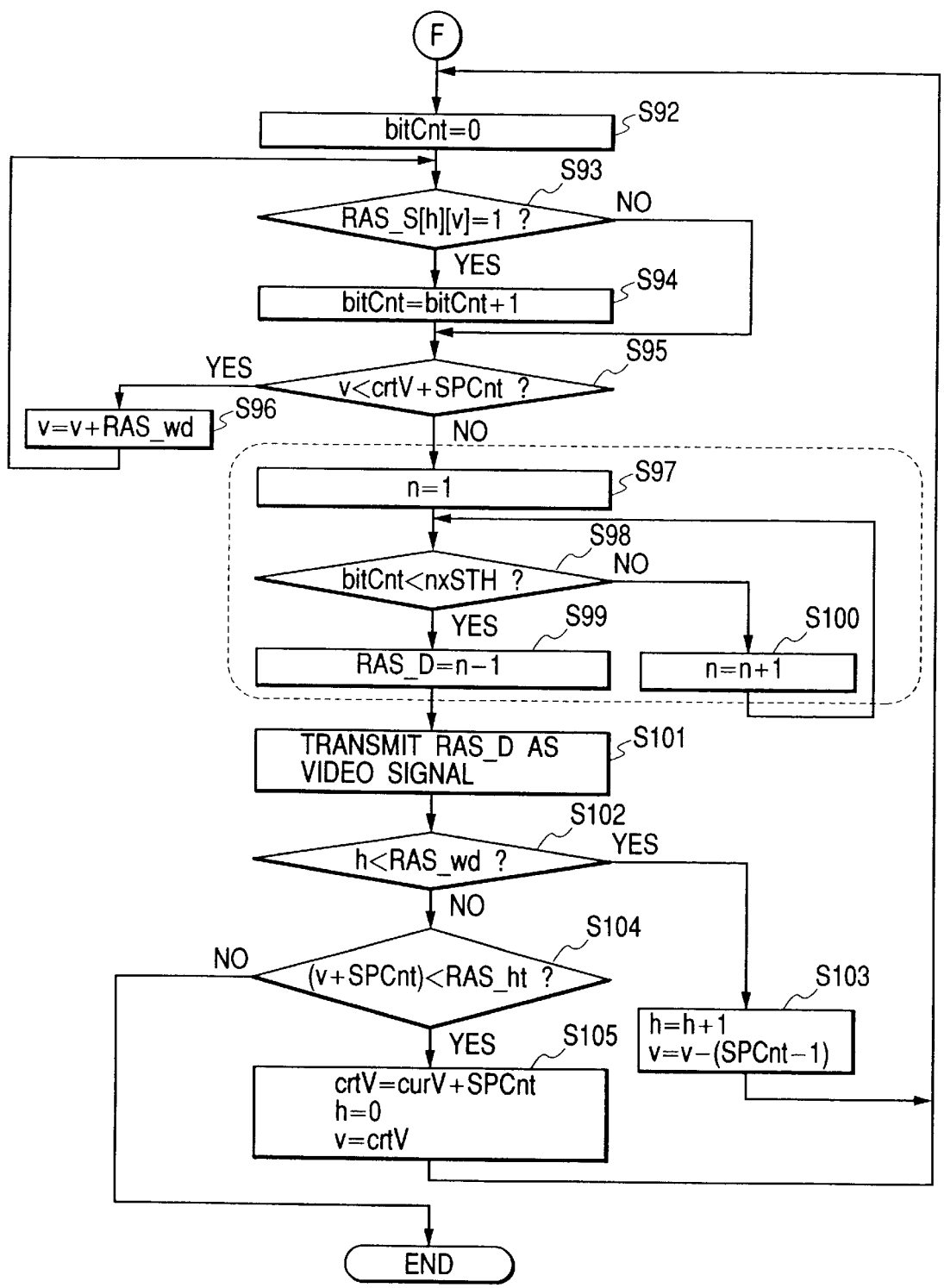
FIG. 13 is a flow chart showing the third control program of the printing apparatus according to the present invention.

FIGS. 11, 12 and 13 are flow charts showing algorithm of the third embodiment.

Since the present embodiment includes a part of the steps explained in the first embodiment, only parts newly added in the present embodiment (i.e., the parts enclosed with dotted lines in FIGS. 11 to 13) will be explained hereinafter.

Steps S71 to S79 in FIG. 11 are similar to the steps S1 to S9 in FIG. 4 (the first embodiment), respectively. In a step S80, the number of representation gradation for each pixel is acquired as depth. Steps S81 to S90 in FIG. 12 are similar to the steps S10 to S19 in FIG. 5 (the first embodiment), respectively.

In a step S91, the division reference value STH=SPCnt/depth is calculated. Since the number of pixels for the unit area is given SPCnt like the multiple-speed number of printing speed, gradations of the density based on the number of lighting pixels within the unit area are given SPCnt+1. Steps S92 to S96 in FIG. 13 are similar to the steps S20 to S24 in FIG. 6 (the first embodiment), respectively.

In a step S97, a variable n representing the multiple number of the division reference value STH is initialized. In a step S98 and subsequent steps, the threshold value is calculated as n×STH. In the step S98, the number bitCnt of "on" pixels within the unit area is compared with the threshold value (n×STH). When bitCnt≧n×STH, then in a step S100 the variable n is incremented by one, and the flow returns to the step S98. Conversely, when bitCnt<n×STH, since a value obtained by subtracting "1" from the current variable n represents a pixel density level posterior to the conversion, then in a step S99 the pixel density level (n−1) is stored as the raster data RAS_D, and the flow advances to a step S101. Steps S101 to S105 in FIG. 13 are similar to the steps S28 to S32 in FIG. 6 (the first embodiment), respectively.

By the above processing, the binary data in the unit area becomes one pixel having a halftone density according to the number of "on" pixels posterior to the conversion.

Fourth Embodiment

Figure 14A:
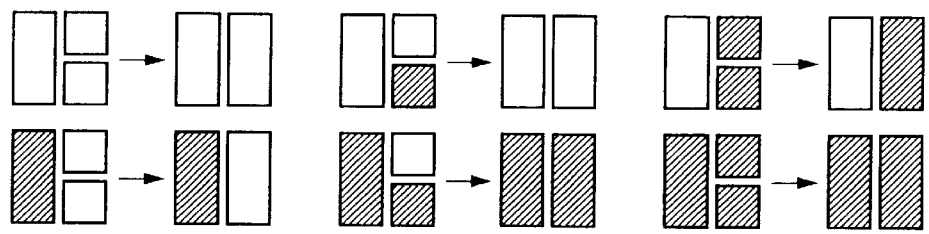
FIGS. 14A and 14B are diagrams showing a fourth pixel conversion (integration) concept of the printing apparatus according to the present invention.
Figure 14B:
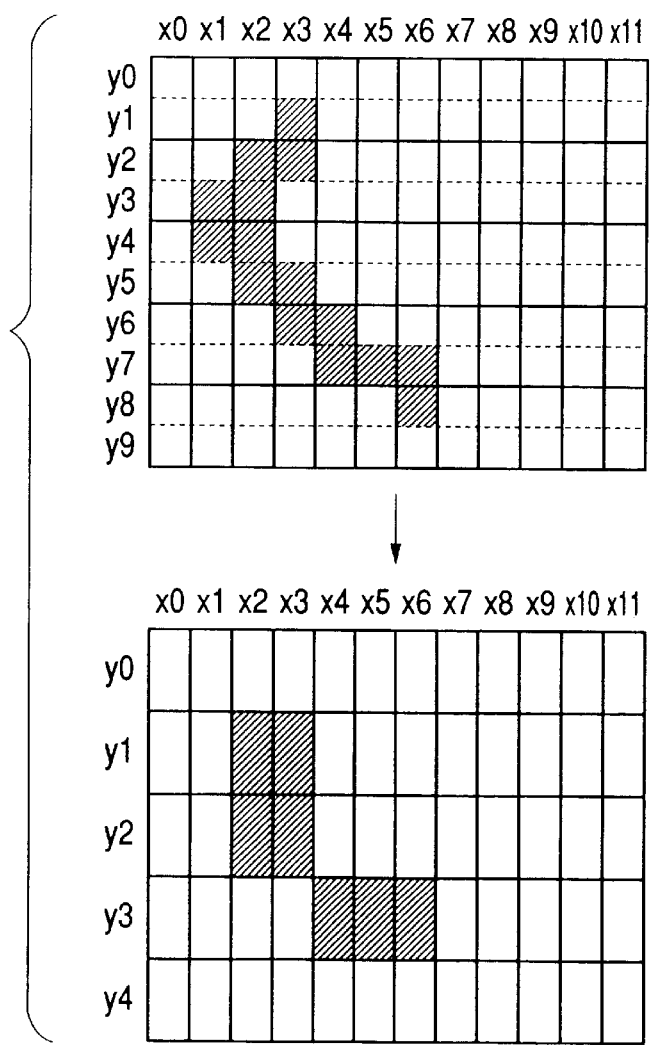

Next, the fourth embodiment will be explained. FIG. 14A shows a pixel integration rule. In this rule, the multiple-speed number of printing speed is set to be "2", the pixel value posterior to the conversion is set to be "0" when the number of pixels occupying more than half the number within the extraction area is smaller than the half, the pixel value posterior to the conversion is set to be "1" when the number of pixels occupying more than half the number is larger than the half, and the pixel value posterior to the conversion is set to be an adjacent-before pixel value posterior to the conversion when the number of pixels occupying more than half the number is the same as the half. According to this pixel integration rule, a threshold value of the pixel number is one pixel (=²⁄₂). Thus, if both the two pixels are "off", a signal becomes "off", while if both the two pixels are "on", the signal becomes "on". Further, if there is as much as one pixel of "on", the signal comes to be the same as that of the adjacent-before pixel. FIG. 14B shows a printed result which is obtained when the resolution of the sub scanning direction is set to be "½" according to the pixel integration rule shown in FIG. 14A.

Figure 15:
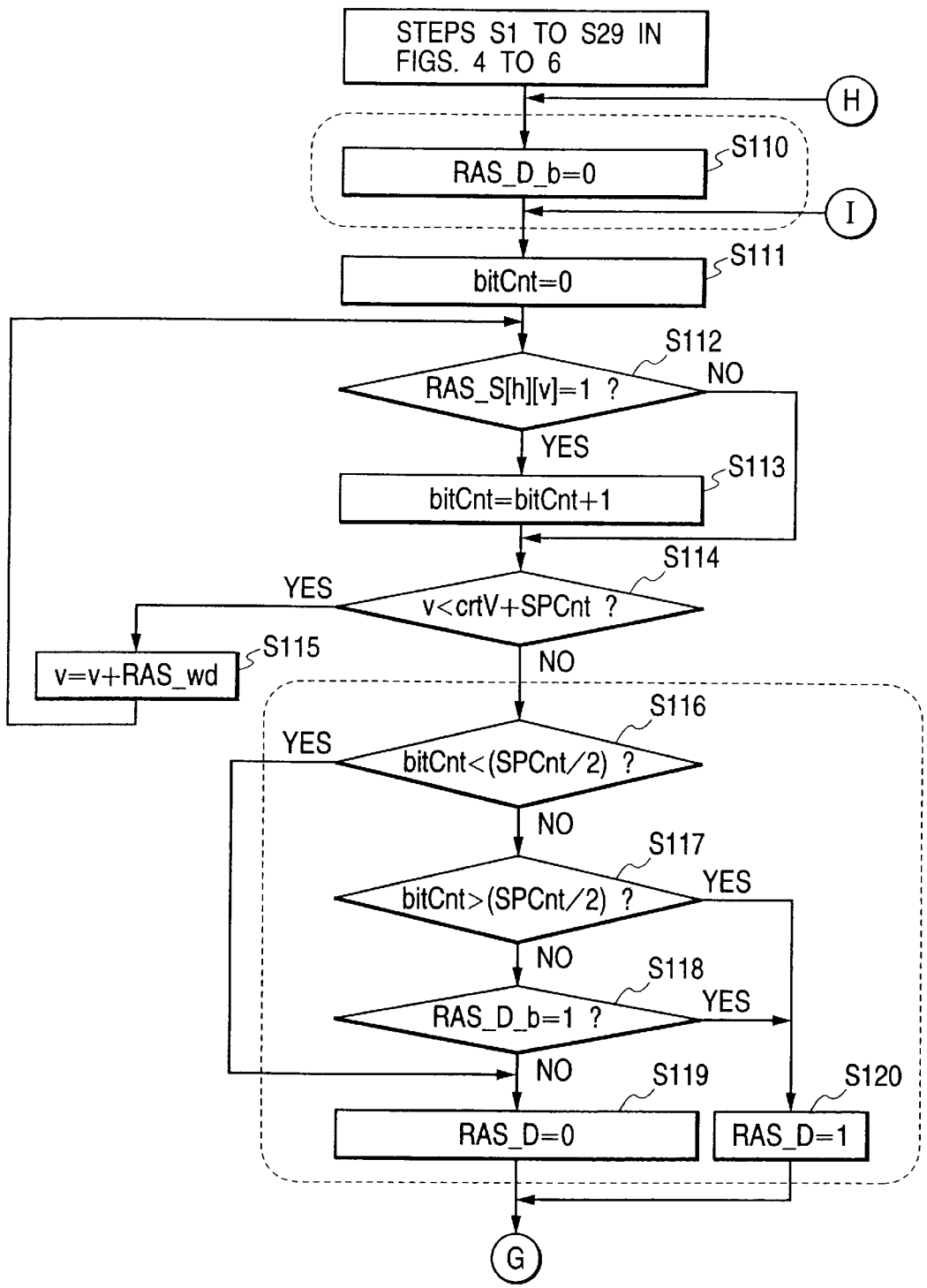
FIG. 15 is a flow chart showing a fourth control program of the printing apparatus according to the present invention.
Figure 16:
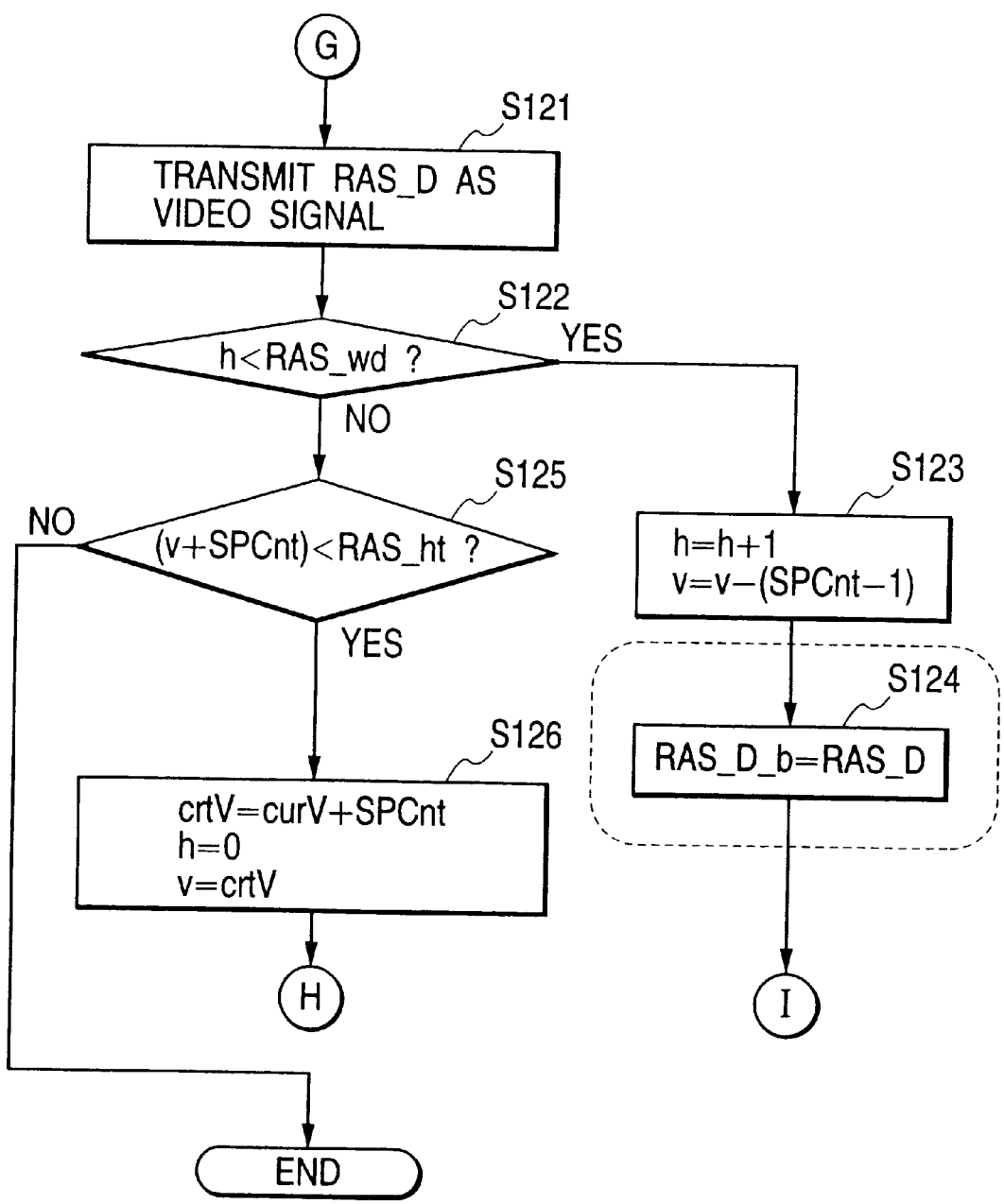
FIG. 16 is a flow chart showing the fourth control program of the printing apparatus according to the present invention.

FIGS. 15 and 16 are flow charts showing algorithm of the fourth embodiment. Hereinafter, only parts different from the first embodiment (i.e., the parts enclosed with dotted lines in FIGS. 15 and 16) will be explained. The steps prior to a step S110 are similar to the steps S1 to S29 in FIGS. 4 to 6.

In a step S110 of FIG. 15, a variable RAS_D-b representing an adjacent-before pixel level of the pixel is initialized. In a step S111, the variable bitCnt representing the number of "on" pixels within the pixel extraction area is initialized. In a step S112, the main scanning direction is assumed to be an x coordinate (the position h), and the sub scanning direction is assumed to be a y coordinate (the position v). When a pixel value RAS_S[h][v] at this time is "on", in a step S113 the variable bitCnt is incremented by one. Conversely, when the pixel value RAS_S[h][v] is "off", the flow directly advances to a step S114. When the multiple-speed value of the printing speed is SPCnt, the number of pixels corresponding to the value SPCnt on the sub scanning line is counted for one video signal. Thus, in the step S114, it is judged how many the target line is. Namely, while the number of pixels within the pixel extraction area is being counted, in a step S115 the pixel position on a next sub scanning line is set to be v, and the flow returns to the step S112.

When counting of the value SPCnt of the sub scanning direction ends, then it is judged in a step S116 whether or not the number of "on" pixels is smaller than SPCnt/2. When it is judged that the number of "on" pixels is smaller than SPCnt/2, in a step S119 the pixel value is set to be "off". Conversely, when it is judged that the number of "on" pixels is not smaller than SPCnt/2, then it is judged in a step S117 whether or not the number of "on" pixels is larger than SPCnt/2. When it is judged that the number of "on" pixels is larger than SPCnt/2, in a step S120 the pixel value is set to be "on". When it is judged that the number of "on" pixels is not larger or smaller than SPCnt/2, since the number of "on" pixels is the same as the number of "off" pixels in the unit area, in a step S118 the value same as the value of the adjacent-before pixel (posterior to the conversion) is set to be the pixel value (RAS_D).

In a step S121 of FIG. 16, the pixel value is transmitted as a video signal to the engine. In a step S122, it is judged whether or not a final position of the main scanning direction was processed. When it is judged that the final position is not processed yet, then in a step S123 the variable h is incremented by one, and the variable v is returned to the head of a next area. In a step S124, the pixel value is updated to be the adjacent-before pixel value, and the flow returns to the step S111 to repeat the counting to the next area. Conversely, when it is judged that the final position was processed, then it is judged in a step S125 whether or not a final position of the sub scanning direction was processed. When it is judged that the final position is not processed yet, then in a step S126 the currently processed sub scanning line position is shifted to the head of the next area. Also, the variables h and v are initialized, and the flow returns to the step S110. Conversely, when it is judged in the step S125 that the final position of the sub scanning direction was processed, the processing ends.

In a storage medium which stores various data processing programs capable of being read by the information processing apparatus according to the present invention, information (e.g., version information, an author, etc.) for managing program groups stored in the medium is also stored. Also, information (e.g., icons for discriminating the programs) depending on an OS (operating system) on the program reading side is occasionally stored in the storage medium.

Further, data depending on various programs is managed in a directory. When programs and data to be installed have been compressed, also a program for decompressing them is occasionally stored in the storage medium.

The functions of the embodiments disclosed in FIGS. 4 to 6, 8, 9, 11 to 13, 15 and 16 may be executed by the host computer according to programs externally installed. On this occasion, the present invention is also applicable to a case where an information group including the program is supplied to an output apparatus from a storage medium such as a CD-ROM, a flash memory, an FD (floppy disk) or the like, or from an external storage medium through a network.

As described above, it is needless to say that the object of the present invention can be achieved also in a case where a storage medium storing program codes of software for realizing the functions of the above-described embodiments is supplied to a system or an apparatus and then a computer (or CPU or MPU) in the system or the apparatus reads and executes the program codes stored in the storage medium.

In this case, the program codes themselves read from the storage medium realize the new functions of the embodiments, and the storage medium storing such the program codes constitutes the present invention.

As the storage medium storing the program codes, e.g., a floppy disk, a hard disk, an optical disk, a magnetooptical disk, a CD-ROM, a CD-R, a magnetic tape, a nonvolatile memory card, a ROM, an EEPROM or the like can be used.

It is needless to say that the present invention also includes not only the case where the functions of the embodiments are realized by executing the program codes read by the computer, but also a case where an OS or the like functioning on the computer executes all the process or a part thereof according to instructions of the program codes, thereby realizing the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to instructions of the program codes, thereby realizing the functions of the embodiments.

Further, the present invention may be applicable to a system comprising plural equipments or an apparatus comprising a single equipment. In addition, it is needless to say that the present invention can be achieved by supplying a program to the system or the apparatus. In this case, the effects of the present invention can be derived when a storage medium storing programs represented by software for achieving the present invention is supplied to a system or an apparatus, and the system or the apparatus reads out the program code stored in that storage medium and then executing it.

Further, when programs represented by software for achieving the present invention are downloaded from a data base on a network by means of a communication program and the downloaded programs are read out by a system or an apparatus, the system or the apparatus can derive the effects of the present invention.

Although the present invention has been explained by using the preferred embodiments, the present invention is not limited to them. Namely, it is needless to say that various modifications and changes are possible in the present invention without departing from the spirit and scope of the appended claims.

What is claimed is:

1. A printing apparatus which has a printing unit capable of performing printing in a main scanning direction and in a sub scanning direction perpendicular to the main scanning direction respectively with different resolutions, comprising:

storage means for storing raster data expanded into binary data of first and second pixel values with a predetermined resolution;

first setting means for setting a multiple-speed number of printing speed to said printing unit, the multiple-speed number representing what times standard printing speed the printing is to be performed at;

second setting means for setting the printing resolution of the main scanning direction to be the resolution of the raster data stored in said storage means, and setting the printing resolution of the sub scanning direction to be a quotient of the resolution of the raster data divided by the multiple-speed number of the printing speed, to said printing unit; and resolution conversion output means for outputting a video signal to said printing unit, the video signal being obtained by integrating to one pixel an area aligned with the sub scanning direction of the raster data stored in said storage means and composed of pixels of the number as much as the multiple-speed number of the printing speed.

2. An apparatus according to claim 1, wherein said resolution conversion output means determines a value of the one pixel obtained by integrating the area, on the basis of the number of pixels of the first pixel value or the number of pixels of the second pixel value existing within the area.

3. An apparatus according to claim 2, wherein, when the number of pixels of the first pixel value is the same as the number of pixels of the second pixel value existing within the area, said resolution conversion output means determines the value of the one pixel obtained by integrating the area, on the basis of distribution position of the pixels having the first pixel value or distribution position of the pixels having the second pixel value existing within the area.

4. A resolution conversion printing method for a printing apparatus having a printing unit capable of performing printing in a main scanning direction and in a sub scanning direction perpendicular to the main scanning direction respectively with different resolutions, said method comprising:

an expansion step of expanding printing information into raster data of a predetermined resolution, on a memory;

a first setting step of setting a multiple-speed number of printing speed to the printing unit, the multiple-speed number representing what times standard printing speed the printing is to be performed at;

a second setting step of setting the printing resolution of the main scanning direction to be the resolution of the raster data expanded on the memory, and setting the printing resolution of the sub scanning direction to be a quotient of the resolution of the raster data divided by the multiple-speed number of the printing speed, to the printing unit; and a resolution conversion output step of outputting a video signal to the printing unit, the video signal being obtained by integrating to one pixel an area aligned with the sub scanning direction of the raster data expanded on the memory and composed of pixels of the number as much as the multiple-speed number of the printing speed.

5. A storage medium which stores a computer-readable program to control a printing apparatus having a printing unit capable of performing printing in a main scanning direction and in a sub scanning direction perpendicular to the main scanning direction respectively with different resolutions, said program comprising:

an expansion step of expanding printing information into raster data of a predetermined resolution, on a memory;

a first setting step of setting a multiple-speed number of printing speed to the printing unit, the multiple-speed number representing what times standard printing speed the printing is to be performed at;

a second setting step of setting the printing resolution of the main scanning direction to be the resolution of the raster data expanded on the memory, and setting the printing resolution of the sub scanning direction to be a quotient of the resolution of the raster data divided by the multiple-speed number of the printing speed, to the printing unit; and a resolution conversion output step of outputting a video signal to the printing unit, the video signal being obtained by integrating to one pixel an area aligned with the sub scanning direction of the raster data expanded on the memory and composed of pixels of the number as much as the multiple-speed number of the printing speed.

6. A printing apparatus which has a printing unit capable of performing printing with resolutions of main and sub scanning directions differentiated by changing printing speed, comprising:

expansion means for expanding printing data from a superior apparatus into raster data with a predetermined resolution;

storage means for storing the expanded raster data;

raster data conversion means for generating, when said printing unit performs the printing at speed N times (N is an integer of two or more) printing speed corresponding to the predetermined resolution, the raster data obtained by integrating to one pixel an area composed of N pixels, on the basis of the raster data of N pixels aligned with the sub scanning direction of the raster data stored in said storage means; and output means for outputting the raster data converted by said raster data conversion means to said printing unit.

7. An apparatus according to claim 6, wherein said raster data conversion means determines a pixel value of the raster data obtained by integrating the N-pixel area to the one pixel, on the basis of the number of pixels of a predetermined pixel value among the N pixels.

8. An apparatus according to claim 7, wherein said raster data conversion means determines the pixel value of the raster data obtained by integrating the N-pixel area to the one pixel, on the basis of the number of pixels of the predetermined pixel value among the N pixels and distribution position of the pixels of the predetermined pixel value within the area.

9. An apparatus according to claim 6, wherein said raster data conversion means determines a pixel value of the raster data obtained by integrating the N-pixel area to the one pixel, on the basis of the sum of the pixel values of the N pixels.

10. An apparatus according to claim 6, wherein said raster data conversion means determines a pixel value of the raster data obtained by integrating the N-pixel area to the one pixel, on the basis of the number of pixels of a predetermined pixel value among the N pixels and a pixel value of the pixel corresponding to an area adjacent to the N-pixel area.

11. A printing apparatus which has a printing unit capable of changing at least a resolution of a predetermined direction, comprising:

expansion means for expanding, even when said printing unit performs the printing for the predetermined direction with a resolution 1/N times (N is an integer of two or more) a predetermined resolution printing data from a superior apparatus into raster data with the predetermined resolution;

storage means for storing the expanded raster data;

raster data conversion means for converting, when said printing unit performs the printing for the predetermined direction with the resolution 1/N times the predetermined resolution, the resolution of the raster data for the predetermined direction by generating a pixel value of one pixel, on the basis of pixel values of N pixels aligned with the predetermined direction of the raster data stored in said storage means; and output means for outputting the raster data converted by said raster data conversion means to said printing unit.

12. An apparatus according to claim 11, wherein said raster data conversion means determines the pixel value of the one pixel to be generated, on the basis of the number of pixels of a predetermined pixel value among the N pixels.

13. An apparatus according to claim 12, wherein said raster data conversion means determines the pixel value of the one pixel to be generated, on the basis of the number of pixels of the predetermined pixel value among the N pixels and positions of the pixels of the predetermined pixel value.

14. An apparatus according to claim 11, wherein said raster data conversion means determines the pixel value of the one pixel to be generated, on the basis of the sum of the pixel values of the N pixels.

15. An apparatus according to claim 11, wherein said raster data conversion means determines the pixel value of the one pixel to be generated, on the basis of the number of pixels of a predetermined pixel value among the N pixels and a pixel value of the pixel adjacent to the N pixels.

16. An image processing method for a printing apparatus having a printing unit capable of changing at least a resolution of a predetermined direction, said method comprising:

an expansion step of expanding, even when the printing unit performs printing with a resolution 1/N times (N is an integer of two or more) a predetermined resolution, printing data from a superior apparatus into raster data with the predetermined resolution;

a storage step of storing the expanded raster data in a storage means;

a raster data conversion step of converting, when the printing unit performs the printing for a predetermined direction with the resolution 1/N times the predetermined resolution, the resolution of the raster data for the predetermined direction by generating a pixel value of one pixel, on the basis of pixel values of N pixels aligned with the predetermined direction of the raster data stored in the storage means; and an output step of outputting the raster data converted in said raster data conversion step to the printing unit.

17. A method according to claim 16, wherein said raster data conversion step determines the pixel value of the one pixel to be generated, on the basis of the number of pixels of a predetermined pixel value among the N pixels.

18. A method according to claim 17, wherein said raster data conversion step determines the pixel value of the one pixel to be generated, on the basis of the number of pixels of the predetermined pixel value among the N pixels and positions of the pixels of the predetermined pixel value.

19. A method according to claim 16, wherein said raster data conversion step determines the pixel value of the one pixel to be generated, on the basis of the sum of the pixel values of the N pixels.

20. A method according to claim 16, wherein said raster data conversion step determines the pixel value of the one pixel to be generated, on the basis of the number of pixels of a predetermined pixel value among the N pixels and a pixel value of the pixel adjacent to the N pixels.

* * * * *